US012720066B2

(12) United States Patent
Sim et al.

(10) Patent No.: US 12,720,066 B2
(45) Date of Patent: Aug. 25, 2026

(54) METHOD AND APPARATUS FOR VIDEO CODING USING INTER/INTRA PREDICTION THAT IS ON BASIS OF GEOMETRIC PARTITION

(71) Applicants: HYUNDAI MOTOR COMPANY, Seoul (KR); KIA CORPORATION, Seoul (KR); KWANGWOON UNIVERSITY INDUSTRY-ACADEMIC COLLABORATION FOUNDATION, Seoul (KR)

(72) Inventors: Dong Gyu Sim, Seoul (KR); Min Hun Lee, Uijeongbu-si (KR); Joo Hyung Byeon, Seoul (KR); Jin Heo, Yongin-si (KR); Seung Wook Park, Yongin-si (KR)

(73) Assignees: HYUNDAI MOTOR COMPANY, Seoul (KR); KIA CORPORATION, Seoul (KR); KWANGWOON UNIVERSITY INDUSTRY-ACADEMIC COLLABORATION FOUNDATION, Seoul (KR)

( * ) Notice: Subject to any disclaimer, the term of this patent is extended or adjusted under 35 U.S.C. 154(b) by 0 days.

(21) Appl. No.: 18/864,482

(22) PCT Filed: Apr. 7, 2023

(86) PCT No.: PCT/KR2023/004722
§ 371 (c)(1),
(2) Date: Nov. 8, 2024

(87) PCT Pub. No.: WO2023/219279
PCT Pub. Date: Nov. 16, 2023

(65) Prior Publication Data

US 2025/0310533 A1 Oct. 2, 2025

(30) Foreign Application Priority Data

May 10, 2022 (KR) ........................ 10-2022-0057158
Apr. 3, 2023 (KR) ........................ 10-2023-0043673

(51) Int. Cl.
*H04N 19/137* (2014.01)
*H04N 19/105* (2014.01)
(Continued)

(52) U.S. Cl.
CPC ......... *H04N 19/137* (2014.11); *H04N 19/105* (2014.11); *H04N 19/119* (2014.11); *H04N 19/176* (2014.11)

(58) Field of Classification Search
CPC .. H04N 19/137; H04N 19/105; H04N 19/119; H04N 19/176; H04N 19/103
(Continued)

(56) References Cited

U.S. PATENT DOCUMENTS 11,330,257 B2 5/2022 Liu et al.
11,405,619 B2 * 8/2022 Reuze .................. H04N 19/105
(Continued)

FOREIGN PATENT DOCUMENTS

CN 101682778 A * 3/2010 ............. H04N 19/57
KR 20200144070 A 12/2020
(Continued)

OTHER PUBLICATIONS

International Search Report and Written Opinion cited in corresponding international patent application No. PCT/KR2023/004722; Jul. 31, 2023; 11 pp.
(Continued)

*Primary Examiner* — Justin W Rider
(74) *Attorney, Agent, or Firm* — Lempia Summerfield Katz LLC

(57) ABSTRACT

A method and an apparatus are disclosed for video coding using inter/intra prediction based on a geometric partition. A
(Continued)

video decoding device decodes, from a bitstream, geometric partition information of the current block, and partitions the current block into multiple sub-regions according to the geometric partition information. The video decoding device parses an index of each of the multiple sub-regions, and the index indicates a prediction mode of each sub-region. The video decoding device generates, based on a value of the index, a predictor for each of the sub-regions by using inter-prediction, intra-prediction, or template matching. The video decoding device generates a final predictor of the current block by weighted-summing predictors of the multiple sub-regions.

16 Claims, 20 Drawing Sheets

(51) Int. Cl.
*H04N 19/119* (2014.01)
*H04N 19/176* (2014.01)

(58) Field of Classification Search
USPC .................................................... 375/240.02
See application file for complete search history.

(56) References Cited

U.S. PATENT DOCUMENTS 11,425,406 B2 8/2022 Liu et al.
11,553,201 B2 1/2023 Liu
11,876,993 B2 1/2024 Liu
12,063,365 B2 8/2024 Lee
12,323,602 B2 * 6/2025 Chen .................... H04N 19/159
2019/0041302 A1 2/2019 Hunt
2021/0144400 A1 5/2021 Liu
2021/0274167 A1 9/2021 Liu et al.
2021/0385481 A1 12/2021 Liu
2022/0070483 A1 3/2022 Liu et al.
2022/0086481 A1 3/2022 Liu
2022/0124349 A1 4/2022 Liu et al.
2022/0248026 A1 8/2022 Lee
2023/0015638 A1 1/2023 Lee
2023/0077554 A1 3/2023 Hunt
2024/0323420 A1 * 9/2024 Chen .................... H04N 19/132
2024/0364892 A1 10/2024 Lee

FOREIGN PATENT DOCUMENTS

KR 20210065051 A 6/2021
KR 20210134347 A 11/2021
KR 20210145747 A 12/2021

OTHER PUBLICATIONS

Yoshitaka Kidani et al., EE2-3.1: GPM with inter and intra prediction (JVET-X0166), Joint Video Experts Team (JVET) of ITU-T SG 16 WP 3 and ISO/IEC JTC 1/SC 29; Doc No. JVET-Y0065; Jan. 2022; 6 pp.

* cited by examiner

Start

Decode Geometric Prediction Mode Flag S700

S702

Is Geometric Prediction Mode Flag True?

No

S706

Perform Inter Prediction

Yes

Perform Prediction In Geometric Prediction Mode S704

End

Initial Intra-Prediction Mode

Final Intra-Prediction Mode

METHOD AND APPARATUS FOR VIDEO CODING USING INTER/INTRA PREDICTION THAT IS ON BASIS OF GEOMETRIC PARTITION

CROSS-REFERENCE TO RELATED APPLICATIONS

This application is a U.S. national stage of International Application No. PCT/KR2023/004722, filed on Apr. 7, 2023, which claims priority to Korean Patent Application Nos. 10-2022-0057158 filed on May 10, 2022 and 10-2023-0043673 filed Apr. 3, 2023, the entire contents of which are incorporated herein by reference.

TECHNICAL FIELD

The present disclosure relates to a method and apparatus using inter/intra prediction based on a geometric partition.

BACKGROUND

The statements in this section merely provide background information related to the present disclosure and do not necessarily constitute prior art.

Since video data has a large amount of data compared to audio or still image data, the video data requires a lot of hardware resources, including a memory, to store or transmit the video data without processing for compression.

Accordingly, an encoder is generally used to compress and store or transmit video data. A decoder receives the compressed video data, decompresses the received compressed video data, and plays the decompressed video data. Video compression techniques include H.264/Advanced Video Coding (AVC), High Efficiency Video Coding (HEVC), and Versatile Video Coding (VVC), which has improved coding efficiency by about 30% or more compared to HEVC.

However, since the image size, resolution, and frame rate gradually increase, the amount of data to be encoded also increases. Accordingly, a new compression technique providing higher coding efficiency and an improved image enhancement effect than existing compression techniques is required.

VVC predicts the current block by using square and rectangular partitions based on quadtree, binary tree, or ternary tree. VVC also employs an inter-prediction technique, Geometric Partitioning Mode (GPM), for prediction based on more flexible partitions. GPM performs the prediction by using the mode index which indicates which of the predefined modes partitions the current block into two regions, and the motion vector information of each region. The encoder transmits the mode index indicating which of the predefined modes of the GPM partitions the current block into two regions, and the motion vector information. The decoder partitions the current block into two regions according to the received GPM partition mode. Then, the decoder generates a prediction block for each region and then uses the weighted-sum process to generate the final prediction block. At this time, the weighted-summing coefficients used in the weighted-sum process may be determined according to the GPM partition mode. Meanwhile, to increase the video coding efficiency and enhance the video quality, improvements in the above-mentioned GPM technology need to be considered.

SUMMARY

The present disclosure seeks to provide a video coding method and an apparatus that, when subblocks are predicted according to a geometric partition in the prediction of a current block, effectively perform inter and/or intra prediction for each partitioned region.

At least one aspect of the present disclosure provides a method of predicting a current block, performed by a video decoding device. The method includes decoding, from a bitstream, geometric partition information of the current block. The method also includes partitioning the current block into multiple sub-regions according to the geometric partition information. The method also includes parsing an index of each of the multiple sub-regions, and the index indicates a prediction mode of each of the sub-regions. The method also includes generating, based on a value of the index, a predictor for each of the sub-regions by using an inter-prediction, an intra-prediction, or a template matching.

Another aspect of the present disclosure provides a method of predicting a current block, performed by a video encoding device. The method includes determining geometric partition information of the current block. The method also includes partitioning the current block into multiple sub-regions according to the geometric partition information. The method also includes determining an index of each of the multiple sub-regions, and the index indicates a prediction mode of each of the sub-regions. The method also includes generating, based on a value of the index, a predictor for each of the sub-regions by using an inter-prediction, an intra-prediction, or a template matching.

Yet another aspect of the present disclosure provides a computer-readable recording medium storing a bitstream generated by a video encoding method. The video encoding method includes determining geometric partition information of a current block. The video encoding method also includes partitioning the current block into multiple sub-regions according to the geometric partition information. The video encoding method also includes determining an index of each of the multiple sub-regions, and the index indicates a prediction mode of each of the sub-regions. The video encoding method also includes generating, based on a value of the index, a predictor for each of the sub-regions by using an inter-prediction, an intra-prediction, or a template matching.

As described above, the present disclosure provides a video coding method and an apparatus that, when subblocks are predicted according to a geometric partition in the prediction of a current block, effectively perform inter and/or intra prediction for each partitioned region. Thus, the video coding method and the apparatus increase video coding efficiency and enhance video quality.

DETAILED DESCRIPTION

Figure 1:
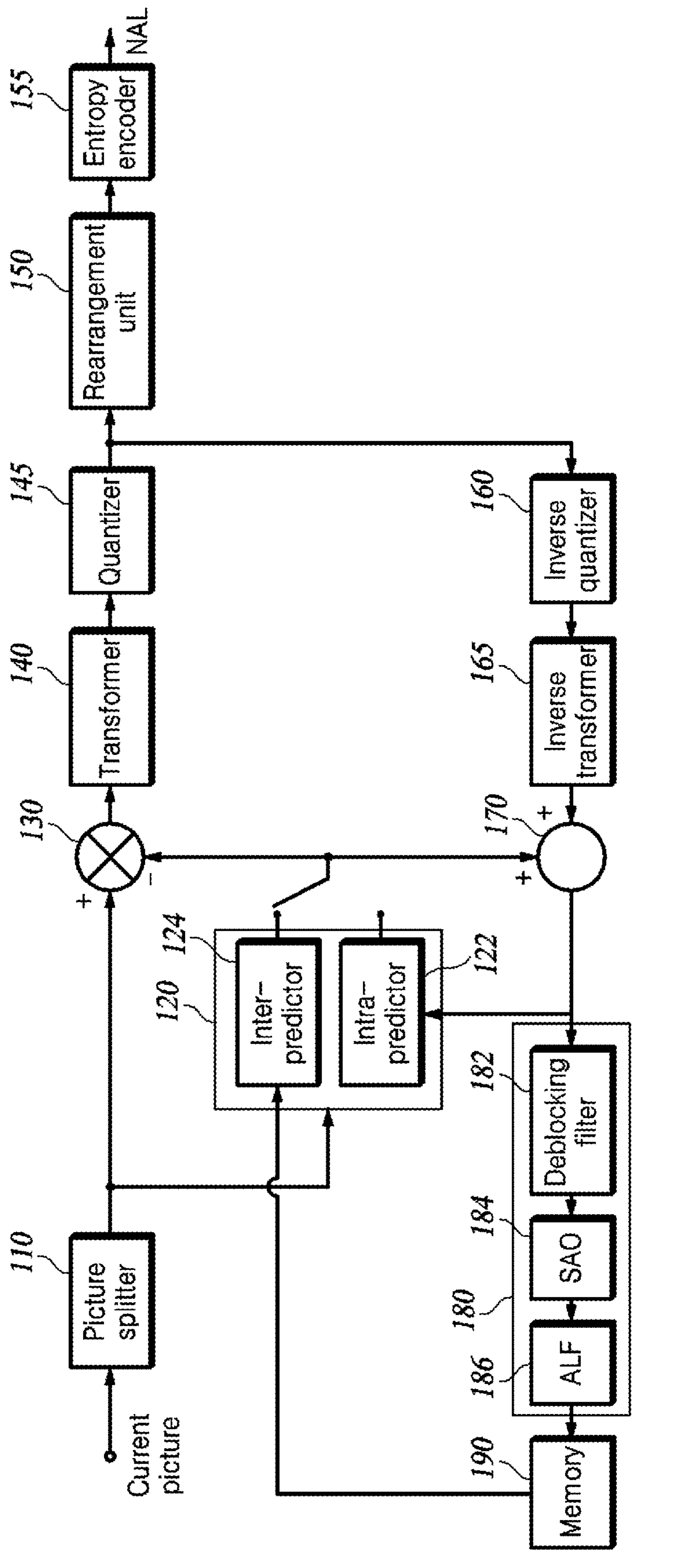
FIG. 1 is a block diagram of a video encoding apparatus that may implement the techniques of the present disclosure.

Hereinafter, some embodiments of the present disclosure are described in detail with reference to the accompanying illustrative drawings. In the following description, like reference numerals designate like elements, although the elements are shown in different drawings. Further, in the following description of some embodiments, detailed descriptions of related known components and functions when considered to obscure the subject of the present disclosure may be omitted for the purpose of clarity and for brevity.

FIG. 1 is a block diagram of a video encoding apparatus that may implement technologies of the present disclosure. Hereinafter, referring to illustration of FIG. 1, the video encoding apparatus and components of the apparatus are described.

The encoding apparatus may include a picture splitter 110, a predictor 120, a subtractor 130, a transformer 140, a quantizer 145, a rearrangement unit 150, an entropy encoder 155, an inverse quantizer 160, an inverse transformer 165, an adder 170, a loop filter unit 180, and a memory 190.

Each component of the encoding apparatus may be implemented as hardware or software or implemented as a combination of hardware and software. Further, a function of each component may be implemented as software, and a microprocessor may also be implemented to execute the function of the software corresponding to each component.

One video is constituted by one or more sequences including a plurality of pictures. Each picture is split into a plurality of areas, and encoding is performed for each area. For example, one picture is split into one or more tiles or/and slices. Here, one or more tiles may be defined as a tile group. Each tile or/and slice is split into one or more coding tree units (CTUs). In addition, each CTU is split into one or more coding units (CUs) by a tree structure. Information applied to each coding unit (CU) is encoded as a syntax of the CU, and information commonly applied to the CUs included in one CTU is encoded as the syntax of the CTU. Further, information commonly applied to all blocks in one slice is encoded as the syntax of a slice header, and information applied to all blocks constituting one or more pictures is encoded to a picture parameter set (PPS) or a picture header. Furthermore, information, which the plurality of pictures commonly refers to, is encoded to a sequence parameter set (SPS). In addition, information, which one or more SPS commonly refer to, is encoded to a video parameter set (VPS). Further, information commonly applied to one tile or tile group may also be encoded as the syntax of a tile or tile group header. The syntaxes included in the SPS, the PPS, the slice header, the tile, or the tile group header may be referred to as a high level syntax.

The picture splitter 110 determines a size of a coding tree unit (CTU). Information on the size of the CTU (CTU size) is encoded as the syntax of the SPS or the PPS and delivered to a video decoding apparatus.

The picture splitter 110 splits each picture constituting the video into a plurality of coding tree units (CTUs) having a predetermined size and then recursively splits the CTU by using a tree structure. A leaf node in the tree structure becomes the coding unit (CU), which is a basic unit of encoding.

The tree structure may be a quadtree (QT) in which a higher node (or a parent node) is split into four lower nodes (or child nodes) having the same size. The tree structure may also be a binarytree (BT) in which the higher node is split into two lower nodes. The tree structure may also be a ternarytree (TT) in which the higher node is split into three lower nodes at a ratio of 1:2:1. The tree structure may also be a structure in which two or more structures among the QT structure, the BT structure, and the TT structure are mixed. For example, a quadtree plus binarytree (QTBT) structure may be used or a quadtree plus binarytree ternarytree (QTBTTT) structure may be used. Here, a binarytree ternarytree (BTTT) is added to the tree structures to be referred to as a multiple-type tree (MTT).

Figure 2:
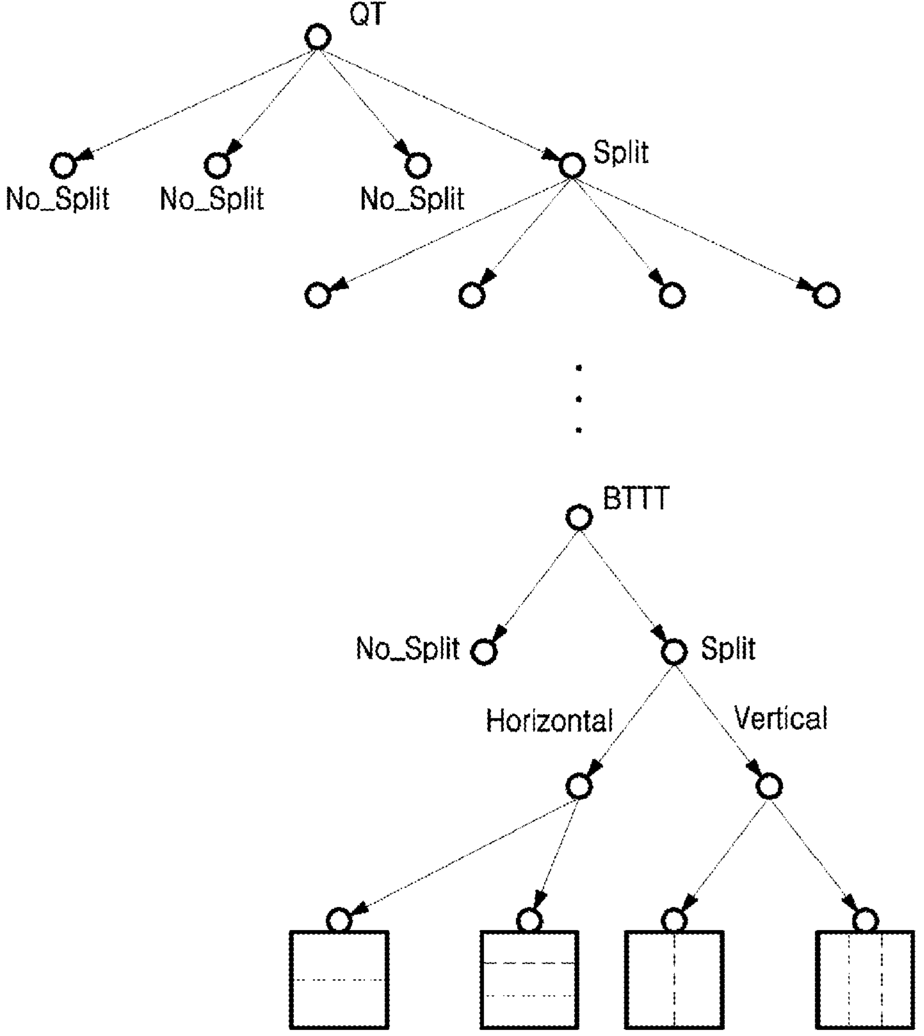
FIG. 2 illustrates a method for partitioning a block using a quadtree plus binarytree ternarytree (QTBTTT) structure.

FIG. 2 is a diagram for describing a method for splitting a block by using a QTBTTT structure.

As illustrated in FIG. 2, the CTU may first be split into the QT structure. Quadtree splitting may be recursive until the size of a splitting block reaches a minimum block size (MinQTSize) of the leaf node permitted in the QT. A first flag (QT_split_flag) indicating whether each node of the QT structure is split into four nodes of a lower layer is encoded by the entropy encoder 155 and signaled to the video decoding apparatus. When the leaf node of the QT is not larger than a maximum block size (MaxBTSize) of a root node permitted in the BT, the leaf node may be further split into at least one of the BT structure or the TT structure. A plurality of split directions may be present in the BT structure and/or the TT structure. For example, there may be two directions, i.e., a direction in which the block of the corresponding node is split horizontally and a direction in which the block of the corresponding node is split vertically. As illustrated in FIG. 2, when the MTT splitting starts, a second flag (mtt_split_flag) indicating whether the nodes are split, and a flag additionally indicating the split direction (vertical or horizontal), and/or a flag indicating a split type (binary or ternary) if the nodes are split are encoded by the entropy encoder 155 and signaled to the video decoding apparatus.

Alternatively, prior to encoding the first flag (QT_split_flag) indicating whether each node is split into four nodes of the lower layer, a CU split flag (split_cu_flag) indicating whether the node is split may also be encoded. When a value of the CU split flag (split_cu_flag) indicates that each node is not split, the block of the corresponding node becomes the leaf node in the split tree structure and becomes the CU, which is the basic unit of encoding. When the value of the CU split flag (split_cu_flag) indicates that each node is split, the video encoding apparatus starts encoding the first flag first by the above-described scheme.

When the QTBT is used as another example of the tree structure, there may be two types, i.e., a type (i.e., symmetric horizontal splitting) in which the block of the corresponding node is horizontally split into two blocks having the same size and a type (i.e., symmetric vertical splitting) in which the block of the corresponding node is vertically split into two blocks having the same size. A split flag (split_flag) indicating whether each node of the BT structure is split into the block of the lower layer and split type information indicating a splitting type are encoded by the entropy encoder 155 and delivered to the video decoding apparatus. Meanwhile, a type in which the block of the corresponding node is split into two blocks asymmetrical to each other may be additionally present. The asymmetrical form may include a form in which the block of the corresponding node is split into two rectangular blocks having a size ratio of 1:3 or may also include a form in which the block of the corresponding node is split in a diagonal direction.

The CU may have various sizes according to QTBT or QTBTTT splitting from the CTU. Hereinafter, a block corresponding to a CU (i.e., the leaf node of the QTBTTT) to be encoded or decoded is referred to as a "current block." As the QTBTTT splitting is adopted, a shape of the current block may also be a rectangular shape in addition to a square shape.

The predictor 120 predicts the current block to generate a prediction block. The predictor 120 includes an intra predictor 122 and an inter predictor 124.

In general, each of the current blocks in the picture may be predictively coded. In general, the prediction of the current block may be performed by using an intra prediction technology (using data from the picture including the current block) or an inter prediction technology (using data from a picture coded before the picture including the current block). The inter prediction includes both unidirectional prediction and bidirectional prediction.

Figure 3A:
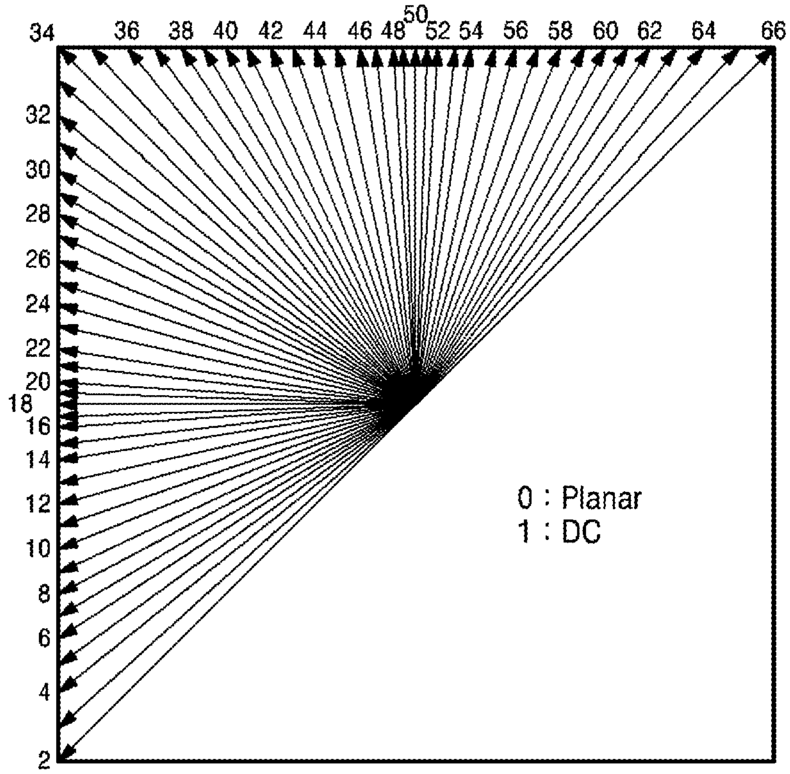
FIGS. 3A and 3B illustrate a plurality of intra prediction modes including wide-angle intra prediction modes.

The intra predictor 122 predicts pixels in the current block by using pixels (reference pixels) positioned on a neighbor of the current block in the current picture including the current block. There is a plurality of intra prediction modes according to the prediction direction. For example, as illustrated in FIG. 3A, the plurality of intra prediction modes may include 2 non-directional modes including a Planar mode and a DC mode and may include 65 directional modes. A neighboring pixel and an arithmetic equation to be used are defined differently according to each prediction mode.

Figure 3B:
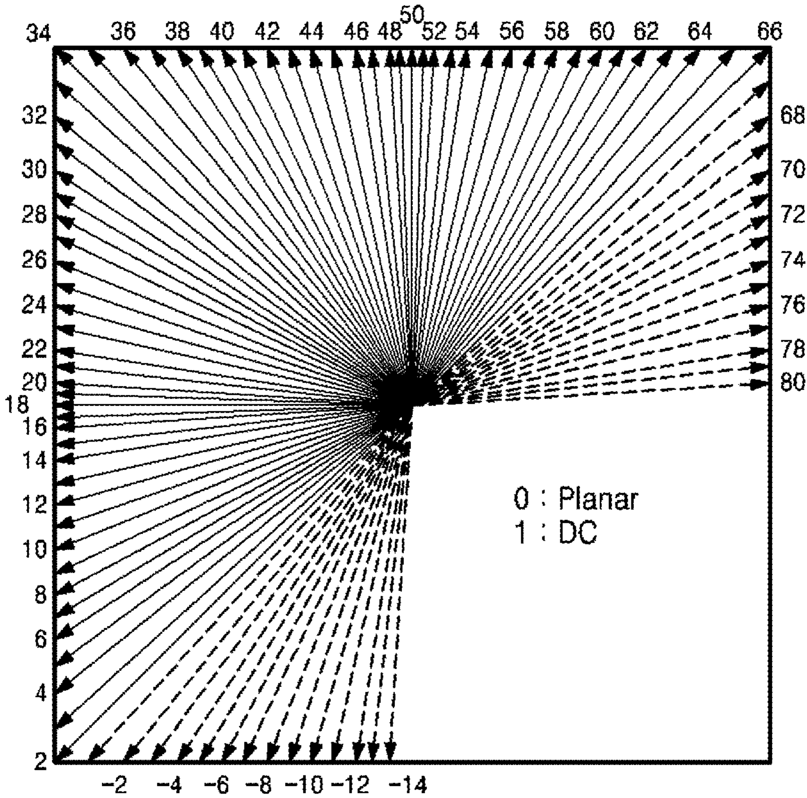

For efficient directional prediction for the current block having a rectangular shape, directional modes (#67 to #80, intra prediction modes #−1 to #−14) illustrated as dotted arrows in FIG. 3B may be additionally used. The directional modes may be referred to as "wide angle intra-prediction modes". In FIG. 3B, the arrows indicate corresponding reference samples used for the prediction and do not represent the prediction directions. The prediction direction is opposite to a direction indicated by the arrow. When the current block has the rectangular shape, the wide angle intra-prediction modes are modes in which the prediction is performed in an opposite direction to a specific directional mode without additional bit transmission. In this case, among the wide angle intra-prediction modes, some wide angle intra-prediction modes usable for the current block may be determined by a ratio of a width and a height of the current block having the rectangular shape. For example, when the current block has a rectangular shape in which the height is smaller than the width, wide angle intra-prediction modes (intra prediction modes #67 to #80) having an angle smaller than 45 degrees are usable. When the current block has a rectangular shape in which the width is larger than the height, the wide angle intra-prediction modes having an angle larger than −135 degrees are usable.

The intra predictor 122 may determine an intra prediction to be used for encoding the current block. In some examples, the intra predictor 122 may encode the current block by using multiple intra prediction modes and may also select an appropriate intra prediction mode to be used from tested modes. For example, the intra predictor 122 may calculate rate-distortion values by using a rate-distortion analysis for multiple tested intra prediction modes and may also select an intra prediction mode having best rate-distortion features among the tested modes.

The intra predictor 122 selects one intra prediction mode among a plurality of intra prediction modes and predicts the current block by using a neighboring pixel (reference pixel) and an arithmetic equation determined according to the selected intra prediction mode. Information on the selected intra prediction mode is encoded by the entropy encoder 155 and delivered to the video decoding apparatus.

The inter predictor 124 generates the prediction block for the current block by using a motion compensation process. The inter predictor 124 searches a block most similar to the current block in a reference picture encoded and decoded earlier than the current picture and generates the prediction block for the current block by using the searched block. In addition, a motion vector (MV) is generated, which corresponds to a displacement between the current block in the current picture and the prediction block in the reference picture. In general, motion estimation is performed for a luma component, and a motion vector calculated based on the luma component is used for both the luma component and a chroma component. Motion information including information on the reference picture and information on the motion vector used for predicting the current block is encoded by the entropy encoder 155 and delivered to the video decoding apparatus.

The inter predictor 124 may also perform interpolation for the reference picture or a reference block in order to increase accuracy of the prediction. In other words, sub-samples between two contiguous integer samples are interpolated by applying filter coefficients to a plurality of contiguous integer samples including two integer samples. When a process of searching a block most similar to the current block is performed for the interpolated reference picture, not integer sample unit precision but decimal unit precision may be expressed for the motion vector. Precision or resolution of the motion vector may be set differently for each target area to be encoded, e.g., a unit such as the slice, the tile, the CTU, the CU, and the like. When such an adaptive motion vector resolution (AMVR) is applied, information on the motion vector resolution to be applied to each target area should be signaled for each target area. For example, when the target area is the CU, the information on the motion vector resolution applied for each CU is signaled. The information on the motion vector resolution may be information representing precision of a motion vector difference to be described below.

Meanwhile, the inter predictor 124 may perform inter prediction by using bi-prediction. In the case of bi-prediction, two reference pictures and two motion vectors representing a block position most similar to the current block in each reference picture are used. The inter predictor 124 selects a first reference picture and a second reference picture from reference picture list 0 (RefPicList0) and reference picture list 1 (RefPicList1), respectively. The inter predictor 124 also searches blocks most similar to the current blocks in the respective reference pictures to generate a first reference block and a second reference block. In addition, the prediction block for the current block is generated by averaging or weighted-averaging the first reference block and the second reference block. In addition, motion information including information on two reference pictures used for predicting the current block and including information on two motion vectors is delivered to the entropy encoder 155. Here, reference picture list 0 may be constituted by pictures before the current picture in a display order among pre-reconstructed pictures, and reference picture list 1 may be constituted by pictures after the current picture in the display order among the pre-reconstructed pictures. However, although not particularly limited thereto, the pre-reconstructed pictures after the current picture in the display order may be additionally included in reference picture list 0. Inversely, the pre-reconstructed pictures before the current picture may also be additionally included in reference picture list 1.

In order to minimize a bit quantity consumed for encoding the motion information, various methods may be used.

For example, when the reference picture and the motion vector of the current block are the same as the reference picture and the motion vector of the neighboring block, information capable of identifying the neighboring block is encoded to deliver the motion information of the current block to the video decoding apparatus. Such a method is referred to as a merge mode.

In the merge mode, the inter predictor 124 selects a predetermined number of merge candidate blocks (hereinafter, referred to as a "merge candidate") from the neighboring blocks of the current block.

Figure 4:
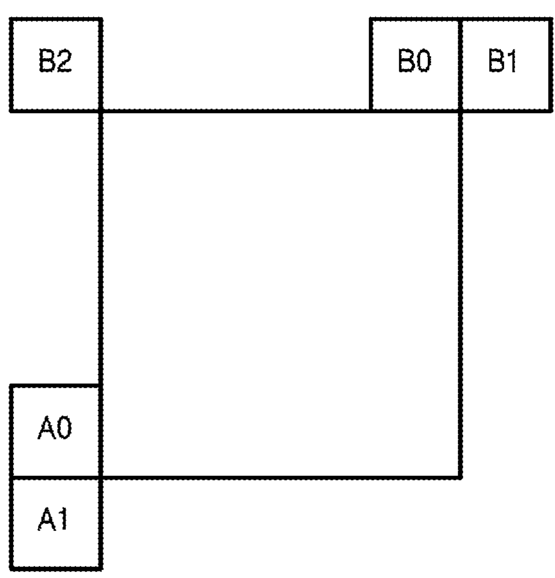
FIG. 4 illustrates neighboring blocks of a current block.

As a neighboring block for deriving the merge candidate, all or some of a left block A0, a bottom left block A1, a top block B0, a top right block B1, and a top left block B2 adjacent to the current block in the current picture may be used as illustrated in FIG. 4. Further, a block positioned within the reference picture (may be the same as or different from the reference picture used for predicting the current block) other than the current picture at which the current block is positioned may also be used as the merge candidate. For example, a co-located block with the current block within the reference picture or blocks adjacent to the co-located block may be additionally used as the merge candidate. If the number of merge candidates selected by the method described above is smaller than a preset number, a zero vector is added to the merge candidate.

The inter predictor 124 configures a merge list including a predetermined number of merge candidates by using the neighboring blocks. A merge candidate to be used as the motion information of the current block is selected from the merge candidates included in the merge list, and merge index information for identifying the selected candidate is generated. The generated merge index information is encoded by the entropy encoder 155 and delivered to the video decoding apparatus.

A merge skip mode is a special case of the merge mode. After quantization, when all transform coefficients for entropy encoding are close to zero, only the neighboring block selection information is transmitted without transmitting residual signals. By using the merge skip mode, it is possible to achieve a relatively high encoding efficiency for images with slight motion, still images, screen content images, and the like.

Hereafter, the merge mode and the merge skip mode are collectively referred to as the merge/skip mode.

Another method for encoding the motion information is an advanced motion vector prediction (AMVP) mode.

In the AMVP mode, the inter predictor 124 derives motion vector predictor candidates for the motion vector of the current block by using the neighboring blocks of the current block. As a neighboring block used for deriving the motion vector predictor candidates, all or some of a left block A0, a bottom left block A1, a top block B0, a top right block B1, and a top left block B2 adjacent to the current block in the current picture illustrated in FIG. 4 may be used. Further, a block positioned within the reference picture (may be the same as or different from the reference picture used for predicting the current block) other than the current picture at which the current block is positioned may also be used as the neighboring block used for deriving the motion vector predictor candidates. For example, a co-located block with the current block within the reference picture or blocks adjacent to the co-located block may be used. If the number of motion vector candidates selected by the method described above is smaller than a preset number, a zero vector is added to the motion vector candidate.

The inter predictor 124 derives the motion vector predictor candidates by using the motion vector of the neighboring blocks and determines motion vector predictor for the motion vector of the current block by using the motion vector predictor candidates. In addition, a motion vector difference is calculated by subtracting motion vector predictor from the motion vector of the current block.

The motion vector predictor may be acquired by applying a pre-defined function (e.g., center value and average value computation, and the like) to the motion vector predictor candidates. In this case, the video decoding apparatus also knows the pre-defined function. Further, since the neighboring block used for deriving the motion vector predictor candidate is a block in which encoding and decoding are already completed, the video decoding apparatus may also already know the motion vector of the neighboring block. Therefore, the video encoding apparatus does not need to encode information for identifying the motion vector predictor candidate. Accordingly, in this case, information on the motion vector difference and information on the reference picture used for predicting the current block are encoded.

Meanwhile, the motion vector predictor may also be determined by a scheme of selecting any one of the motion vector predictor candidates. In this case, information for identifying the selected motion vector predictor candidate is additional encoded jointly with the information on the motion vector difference and the information on the reference picture used for predicting the current block.

The subtractor 130 generates a residual block by subtracting the prediction block generated by the intra predictor 122 or the inter predictor 124 from the current block.

The transformer 140 transforms residual signals in a residual block having pixel values of a spatial domain into transform coefficients of a frequency domain. The transformer 140 may transform residual signals in the residual block by using a total size of the residual block as a transform unit or also split the residual block into a plurality of subblocks and may perform the transform by using the subblock as the transform unit. Alternatively, the residual block is divided into two subblocks, which are a transform area and a non-transform area, to transform the residual signals by using only the transform area subblock as the transform unit. Here, the transform area subblock may be one of two rectangular blocks having a size ratio of 1:1 based on a horizontal axis (or vertical axis). In this case, a flag (cu_sbt_flag) indicates that only the subblock is transformed, and directional (vertical/horizontal) information (cu_sbt_horizontal_flag) and/or positional information (cu_sbt_pos_flag) are encoded by the entropy encoder 155 and signaled to the video decoding apparatus. Further, a size of the transform area subblock may have a size ratio of 1:3 based on the horizontal axis (or vertical axis). In this case, a flag (cu_sbt_quad_flag) dividing the corresponding splitting is additionally encoded by the entropy encoder 155 and signaled to the video decoding apparatus.

Meanwhile, the transformer 140 may perform the transform for the residual block individually in a horizontal direction and a vertical direction. For the transform, various types of transform functions or transform matrices may be used. For example, a pair of transform functions for horizontal transform and vertical transform may be defined as a multiple transform set (MTS). The transformer 140 may select one transform function pair having highest transform efficiency in the MTS and may transform the residual block in each of the horizontal and vertical directions. Information (mts_idx) on the transform function pair in the MTS is encoded by the entropy encoder 155 and signaled to the video decoding apparatus.

The quantizer 145 quantizes the transform coefficients output from the transformer 140 using a quantization parameter and outputs the quantized transform coefficients to the entropy encoder 155. The quantizer 145 may also immediately quantize the related residual block without the transform for any block or frame. The quantizer 145 may also apply different quantization coefficients (scaling values) according to positions of the transform coefficients in the transform block. A quantization matrix applied to quantized transform coefficients arranged in 2 dimensional may be encoded and signaled to the video decoding apparatus.

The rearrangement unit 150 may perform realignment of coefficient values for quantized residual values.

The rearrangement unit 150 may change a 2D coefficient array to a 1D coefficient sequence by using coefficient scanning. For example, the rearrangement unit 150 may output the 1D coefficient sequence by scanning a DC coefficient to a high-frequency domain coefficient by using a zig-zag scan or a diagonal scan. According to the size of the transform unit and the intra prediction mode, vertical scan of scanning a 2D coefficient array in a column direction and horizontal scan of scanning a 2D block type coefficient in a row direction may also be used instead of the zig-zag scan. In other words, according to the size of the transform unit and the intra prediction mode, a scan method to be used may be determined among the zig-zag scan, the diagonal scan, the vertical scan, and the horizontal scan.

The entropy encoder 155 generates a bitstream by encoding a sequence of 1D quantized transform coefficients output from the rearrangement unit 150 by using various encoding schemes including a Context-based Adaptive Binary Arithmetic Code (CABAC), an Exponential Golomb, or the like.

Further, the entropy encoder 155 encodes information, such as a CTU size, a CTU split flag, a QT split flag, an MTT split type, an MTT split direction, etc., related to the block splitting to allow the video decoding apparatus to split the block equally to the video encoding apparatus. Further, the entropy encoder 155 encodes information on a prediction type indicating whether the current block is encoded by intra prediction or inter prediction. The entropy encoder 155 encodes intra prediction information (i.e., information on an intra prediction mode) or inter prediction information (in the case of the merge mode, a merge index and in the case of the AMVP mode, information on the reference picture index and the motion vector difference) according to the prediction type. Further, the entropy encoder 155 encodes information related to quantization, i.e., information on the quantization parameter and information on the quantization matrix.

The inverse quantizer 160 dequantizes the quantized transform coefficients output from the quantizer 145 to generate the transform coefficients. The inverse transformer 165 transforms the transform coefficients output from the inverse quantizer 160 into a spatial domain from a frequency domain to reconstruct the residual block.

The adder 170 adds the reconstructed residual block and the prediction block generated by the predictor 120 to reconstruct the current block. Pixels in the reconstructed current block may be used as reference pixels when intra-predicting a next-order block.

The loop filter unit 180 performs filtering for the reconstructed pixels in order to reduce blocking artifacts, ringing artifacts, blurring artifacts, etc., which occur due to block based prediction and transform/quantization. The loop filter unit 180 as an in-loop filter may include all or some of a deblocking filter 182, a sample adaptive offset (SAO) filter 184, and an adaptive loop filter (ALF) 186.

The deblocking filter 182 filters a boundary between the reconstructed blocks in order to remove a blocking artifact, which occurs due to block unit encoding/decoding, and the SAO filter 184 and the ALF 186 perform additional filtering for a deblocked filtered video. The SAO filter 184 and the ALF 186 are filters used for compensating differences between the reconstructed pixels and original pixels, which occur due to lossy coding. The SAO filter 184 applies an offset as a CTU unit to enhance a subjective image quality and encoding efficiency. On the other hand, the ALF 186 performs block unit filtering and compensates distortion by applying different filters by dividing a boundary of the corresponding block and a degree of a change amount. Information on filter coefficients to be used for the ALF may be encoded and signaled to the video decoding apparatus.

The reconstructed block filtered through the deblocking filter 182, the SAO filter 184, and the ALF 186 is stored in the memory 190. When all blocks in one picture are reconstructed, the reconstructed picture may be used as a reference picture for inter predicting a block within a picture to be encoded afterwards.

Figure 5:
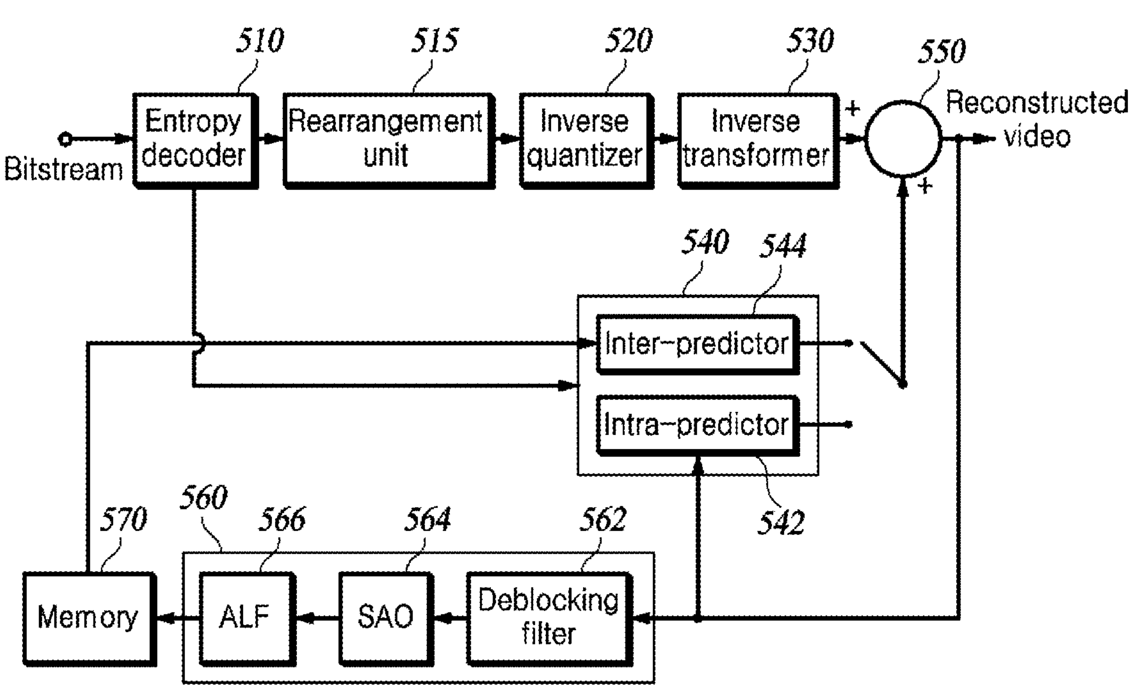
FIG. 5 is a block diagram of a video decoding apparatus that may implement the techniques of the present disclosure.

FIG. 5 is a functional block diagram of a video decoding apparatus that may implement the technologies of the present disclosure. Hereinafter, referring to FIG. 5, the video decoding apparatus and components of the apparatus are described.

The video decoding apparatus may include an entropy decoder 510, a rearrangement unit 515, an inverse quantizer 520, an inverse transformer 530, a predictor 540, an adder 550, a loop filter unit 560, and a memory 570.

Similar to the video encoding apparatus of FIG. 1, each component of the video decoding apparatus may be implemented as hardware or software or implemented as a combination of hardware and software. Further, a function of each component may be implemented as the software, and a microprocessor may also be implemented to execute the function of the software corresponding to each component.

The entropy decoder 510 extracts information related to block splitting by decoding the bitstream generated by the video encoding apparatus to determine a current block to be decoded and extracts prediction information required for reconstructing the current block and information on the residual signals.

The entropy decoder 510 determines the size of the CTU by extracting information on the CTU size from a sequence parameter set (SPS) or a picture parameter set (PPS) and splits the picture into CTUs having the determined size. In addition, the CTU is determined as a highest layer of the tree structure, i.e., a root node, and split information for the CTU may be extracted to split the CTU by using the tree structure.

For example, when the CTU is split by using the QTBTTT structure, a first flag (QT_split_flag) related to splitting of the QT is first extracted to split each node into four nodes of the lower layer. In addition, a second flag (mtt_split_flag), a split direction (vertical/horizontal), and/or a split type (binary/ternary) related to splitting of the MTT are extracted with respect to the node corresponding to the leaf node of the QT to split the corresponding leaf node into an MTT structure. As a result, each of the nodes below the leaf node of the QT is recursively split into the BT or TT structure.

As another example, when the CTU is split by using the QTBTTT structure, a CU split flag (split_cu_flag) indicating whether the CU is split is extracted. When the corresponding block is split, the first flag (QT_split_flag) may also be extracted. During a splitting process, with respect to each node, recursive MTT splitting of 0 times or more may occur after recursive QT splitting of 0 times or more. For example, with respect to the CTU, the MTT splitting may immediately occur, or on the contrary, only QT splitting of multiple times may also occur.

As another example, when the CTU is split by using the QTBT structure, the first flag (QT_split_flag) related to the splitting of the QT is extracted to split each node into four nodes of the lower layer. In addition, a split flag (split_flag) indicating whether the node corresponding to the leaf node of the QT is further split into the BT, and split direction information are extracted.

Meanwhile, when the entropy decoder 510 determines a current block to be decoded by using the splitting of the tree structure, the entropy decoder 510 extracts information on a prediction type indicating whether the current block is intra predicted or inter predicted. When the prediction type information indicates the intra prediction, the entropy decoder 510 extracts a syntax element for intra prediction information (intra prediction mode) of the current block. When the prediction type information indicates the inter prediction, the entropy decoder 510 extracts information representing a syntax element for inter prediction information, i.e., a motion vector and a reference picture to which the motion vector refers.

Further, the entropy decoder 510 extracts quantization related information and extracts information on the quantized transform coefficients of the current block as the information on the residual signals.

The rearrangement unit 515 may change a sequence of 1D quantized transform coefficients entropy-decoded by the entropy decoder 510 to a 2D coefficient array (i.e., block) again in a reverse order to the coefficient scanning order performed by the video encoding apparatus.

The inverse quantizer 520 dequantizes the quantized transform coefficients and dequantizes the quantized transform coefficients by using the quantization parameter. The inverse quantizer 520 may also apply different quantization coefficients (scaling values) to the quantized transform coefficients arranged in 2D. The inverse quantizer 520 may perform dequantization by applying a matrix of the quantization coefficients (scaling values) from the video encoding apparatus to a 2D array of the quantized transform coefficients.

The inverse transformer 530 generates the residual block for the current block by reconstructing the residual signals by inversely transforming the dequantized transform coefficients into the spatial domain from the frequency domain.

Further, when the inverse transformer 530 inversely transforms a partial area (subblock) of the transform block, the inverse transformer 530 extracts a flag (cu_sbt_flag) that only the subblock of the transform block is transformed, directional (vertical/horizontal) information (cu_sbt_horizontal_flag) of the subblock, and/or positional information (cu_sbt_pos_flag) of the subblock. The inverse transformer 530 also inversely transforms the transform coefficients of the corresponding subblock into the spatial domain from the frequency domain to reconstruct the residual signals and fills an area, which is not inversely transformed, with a value of "0" as the residual signals to generate a final residual block for the current block.

Further, when the MTS is applied, the inverse transformer 530 determines the transform index or the transform matrix to be applied in each of the horizontal and vertical directions by using the MTS information (mts_idx) signaled from the video encoding apparatus. The inverse transformer 530 also performs inverse transform for the transform coefficients in the transform block in the horizontal and vertical directions by using the determined transform function.

The predictor 540 may include an intra predictor 542 and an inter predictor 544. The intra predictor 542 is activated when the prediction type of the current block is the intra prediction, and the inter predictor 544 is activated when the prediction type of the current block is the inter prediction.

The intra predictor 542 determines the intra prediction mode of the current block among the plurality of intra prediction modes from the syntax element for the intra prediction mode extracted from the entropy decoder 510. The intra predictor 542 also predicts the current block by using neighboring reference pixels of the current block according to the intra prediction mode.

The inter predictor 544 determines the motion vector of the current block and the reference picture to which the motion vector refers by using the syntax element for the inter prediction mode extracted from the entropy decoder 510.

The adder 550 reconstructs the current block by adding the residual block output from the inverse transformer 530 and the prediction block output from the inter predictor 544 or the intra predictor 542. Pixels within the reconstructed current block are used as a reference pixel upon intra predicting a block to be decoded afterwards.

The loop filter unit 560 as an in-loop filter may include a deblocking filter 562, an SAO filter 564, and an ALF 566. The deblocking filter 562 performs deblocking filtering a boundary between the reconstructed blocks in order to remove the blocking artifact, which occurs due to block unit decoding. The SAO filter 564 and the ALF 566 perform additional filtering for the reconstructed block after the deblocking filtering in order to compensate differences between the reconstructed pixels and original pixels, which occur due to lossy coding. The filter coefficients of the ALF are determined by using information on filter coefficients decoded from the bitstream.

The reconstructed block filtered through the deblocking filter 562, the SAO filter 564, and the ALF 566 is stored in the memory 570. When all blocks in one picture are reconstructed, the reconstructed picture may be used as a reference picture for inter predicting a block within a picture to be encoded afterwards.

The present disclosure in some embodiments relates to encoding and decoding video images as described above. More specifically, the present disclosure provides a video coding method and an apparatus that, when subblocks are predicted based on a geometric partition in prediction of the current block, perform inter and/or intra prediction on each partitioned region effectively.

The following embodiments may be performed by the predictor 120 in the video encoding device. The following embodiments may also be performed by the predictor 540 in the video decoding device.

The video encoding device in the prediction of the current block may generate signaling information associated with the present embodiments in terms of optimizing rate distortion. The video encoding device may use the entropy encoder 155 to encode the signaling information and transmit the encoded signaling information to the video decoding device. The video decoding device may use the entropy decoder 510 to decode, from the bitstream, the signaling information associated with the prediction of the current block.

In the following description, the term "target block" may be used interchangeably with the current block or coding unit (CU), or may refer to some area of a coding unit.

Further, the value of one flag being true indicates when the flag is set to 1. Additionally, the value of one flag being false indicates when the flag is set to 0.

The following embodiments are described about the video decoding device, but they may also be performed by the video encoding device as described above.

Figures 6, 7:
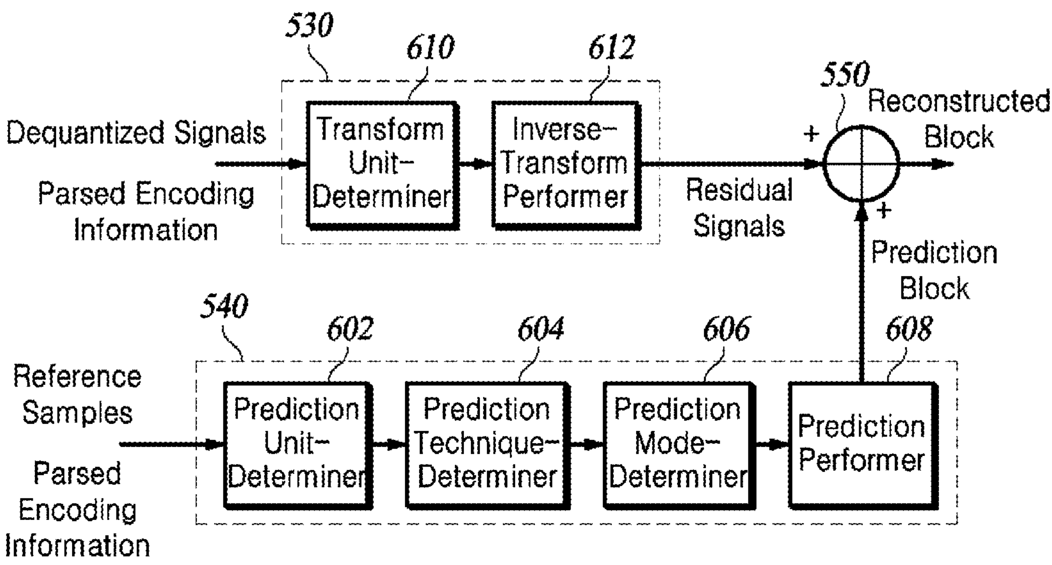
FIG. 6 is a block diagram detailing a portion of a video decoding device according to at least one embodiment of the present disclosure.
FIG. 7 is a flowchart of the application of a geometric prediction mode according to at least one embodiment of the present disclosure.

FIG. 6 is a block diagram detailing a portion of a video decoding device according to at least one embodiment of the present disclosure.

The video decoding device according to this embodiment may determine a prediction unit and a transform unit, and perform a prediction and an inverse transform on a current block corresponding to the determined unit by using the determined prediction technique and prediction mode, thereby finally generating a reconstructed block of the current block. As illustrated in FIG. 6, this may be performed in the video decoding device by an inverse transformer 530, a predictor 540, and an adder 550. On the other hand, the same operations as illustrated in FIG. 6 may be performed in the video encoding device by the inverse transformer 165, the picture splitter 110, the predictor 120, and the adder 170. In this case, the video decoding device uses encoded information parsed from the bitstream, whereas the video encoding device may use encoded information set from a higher level in terms of minimizing rate distortion. Hereinafter, for convenience, the present embodiment will be described centered on the video decoding device.

The predictor 540 illustrated in FIG. 5 includes the intra-predictor 542 and the inter-predictor 544 depending on the prediction technique, but the predictor 540 illustrated in FIG. 6 may include all or part of a prediction unit-determiner 602, a prediction technique-determiner 604, a prediction mode-determiner 606, and a prediction performer 608. The prediction unit-determiner 602 determines a prediction unit (PU). The prediction unit may be the current block or one subblock of subblocks obtained by partitioning the current block. The prediction technique-determiner 604 determines a prediction technique for the prediction unit, e.g., intra-prediction, inter-prediction, or intra block copy (IBC) prediction, palette mode, and the like. The prediction mode-determiner 606 determines a detailed prediction mode for the prediction technique. The prediction performer 608 generates a prediction block of the current block according to the determined prediction mode.

The inverse transformer 530 includes a transform unit-determiner 610 and an inverse transform performer 612. The transform unit-determiner 610 determines a transform unit (TU) for the inverse-quantized signals of the current block, and the inverse transform performer 612 generates residual signals by inversely transforming the transform unit represented by the inverse-quantized signals.

The adder 550 sums the prediction block and the residual signals to generate a reconstructed block. The reconstructed block is stored in memory and may be utilized for future prediction of other blocks.

As described above, the prediction technique of the current block may be determined by the prediction technique-determiner 604. The prediction technique may be one of the techniques such as inter-prediction, intra-prediction, IBC mode, palette mode, template matching, and the like.

In one example, if the prediction technique for the current block is not intra prediction, the prediction technique-determiner 604 parses a one-bit flag. If that flag is skip mode, the prediction technique-determiner 604 may determine the prediction technique of the current block to be inter-prediction, IBC mode, or merge mode, and may omit the inverse transform process.

On the other hand, if the current block is not in skip mode, the prediction technique-determiner 604 may parse the 1-bit flag and may determine, based on the flag value, one of inter-prediction, intra-prediction, IBC mode, palette mode, and template matching as the prediction technique of the current block.

As another example, if the prediction technique of the current block is determined to be the inter prediction, the prediction technique-determiner 604 may parse the 1-bit flag to determine, based on the flag value, whether to perform prediction of the current block in merge mode or advanced motion vector prediction (AMVP) mode.

FIG. 7 is a flowchart of the application of a geometric prediction mode according to at least one embodiment of the present disclosure.

Hereinafter, a geometric prediction mode commonly refers to prediction modes based on a geometric partition.

Figure 8:
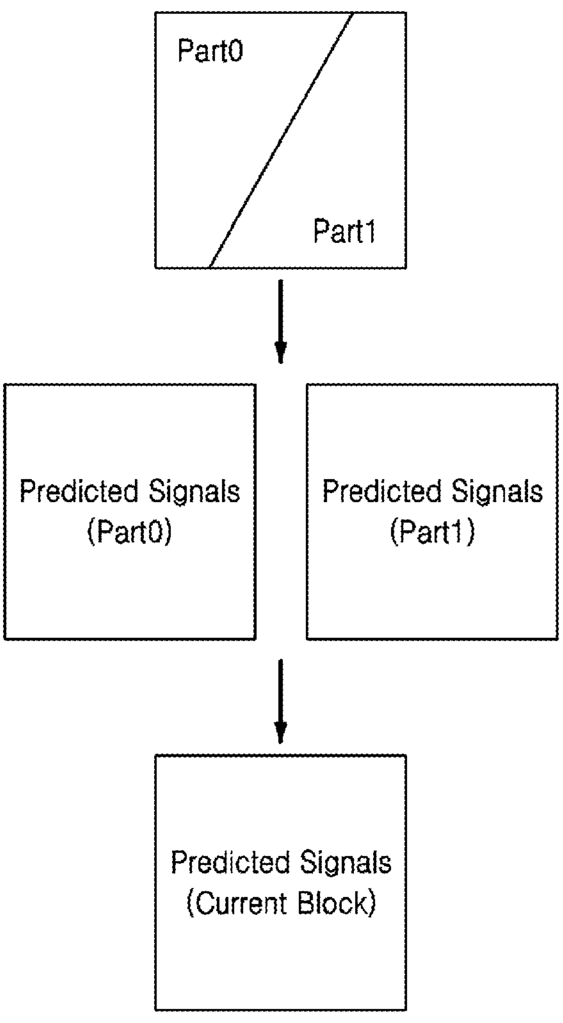
FIG. 8 is a diagram illustrating a prediction of the current block according to the geometric prediction mode.

On the other hand, if the prediction technique of the current block is the inter prediction, the prediction mode-determiner 606 parses a one-bit flag indicating whether the geometric prediction mode is applied (hereinafter, the 'geometric prediction mode flag') (S700) and checks the parsed flag (S702). If the geometric prediction mode flag is true (Yes in S702), the prediction mode-determiner 606 determines the prediction mode of the current block to be the geometric prediction mode. Then, the video decoding device performs prediction of the current block in the geometric prediction mode (S704), as shown in the example of FIG. 8.

On the other hand, if the geometric prediction mode flag is false (no in S702), the prediction mode-determiner 606 determines the prediction mode of the current block as one of the inter-prediction modes. Then, the video decoding device performs prediction of the current block according to the determined inter-prediction mode (S706).

The application of the geometric prediction mode according to the example of FIG. 7 may be similarly performed by the video encoding device.

Figure 9A:
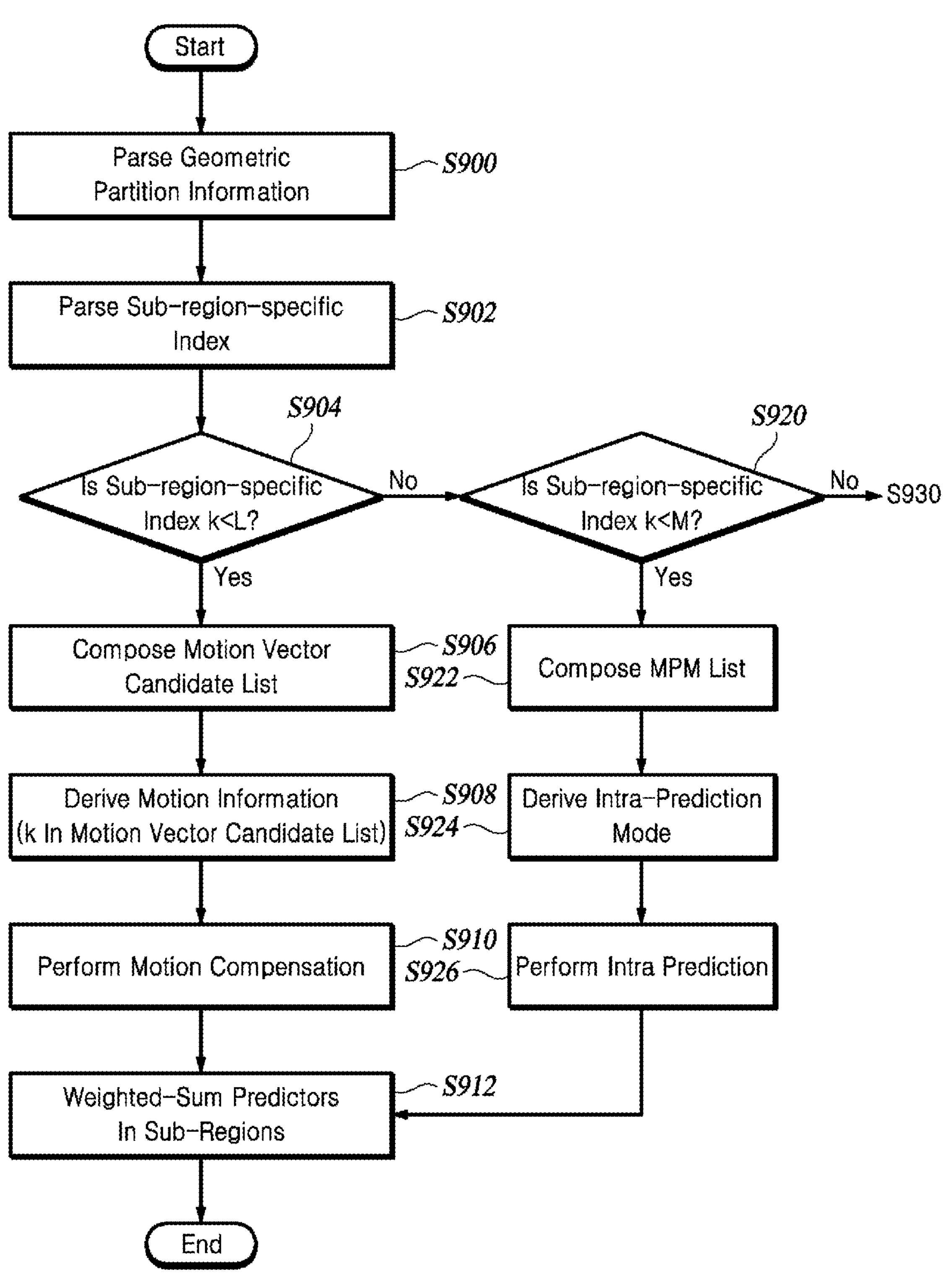
FIGS. 9A and 9B are a flowchart of a prediction of the current block based on the geometric prediction mode, according to at least one embodiment of the present disclosure.
Figure 9B:
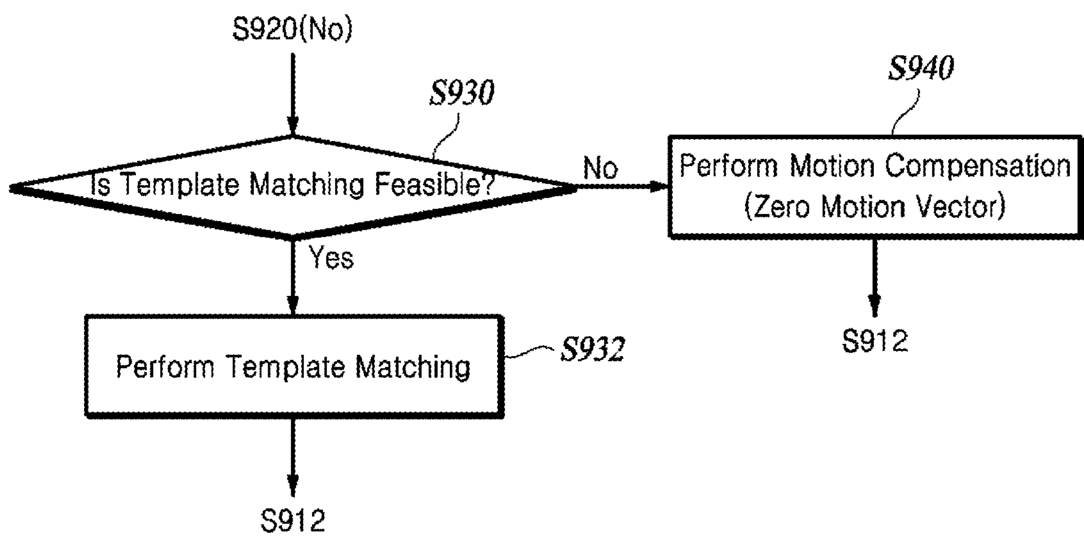

FIGS. 9A and 9B are a flowchart of a prediction of the current block based on the geometric prediction mode, according to at least one embodiment of the present disclosure.

In the geometric prediction mode, as illustrated in FIGS. 9A and 9B, the video decoding device partitions the current block into a plurality of sub-regions, performs a prediction on each sub-region, and then utilizes the sub-regions to generate a final predicted block. The example of FIGS. 9A and 9B are a flowchart detailing Step S704 performed when the geometric prediction mode flag is true.

The video decoding device parses the geometric partition information of the current block (S900). In one example, the geometric partition information may be predefined by using a lookup table (LUT) commonly between the video encoding device and the video decoding device. For example, if the current block is partitioned into two sub-regions, the geometric partition information may include an angle of the partition line and a distance from a particular pixel.

In this embodiment, the current block may be partitioned into P sub-regions (where P is an integer greater than or equal to 2) based on the geometric partition information. The video decoding device may parse an index indicating the geometric partition information, and then may obtain the geometric partition information of the current block from the above-described LUT by using the parsed index.

In one example, a prediction technique, such as inter-prediction, intra-prediction, template matching, or the like, may be determined for each sub-region.

The video decoding device parses the sub-region-specific indices for the P sub-regions (S902). Here, the sub-region-specific index k may indicate a prediction mode of each sub-region.

The video decoding device determines whether the sub-region-specific index k is less than a preset L (S904).

If the sub-region-specific index k is less than the preset L (Yes in S904), the video decoding device performs the following steps for performing the inter prediction on each sub-region.

In one example, the video decoding device composes a motion vector candidate list by using information on the reconstructed neighboring blocks of the current block (S906). To compose the motion vector candidate list, the video decoding device may utilize the reconstructed spatially neighboring region of the current block, the temporal neighboring region at the corresponding position of the reconstructed reference frame, the reconstructed spatially neighboring blocks according to the encoding order, and the like. In this case, the number of candidates may be L, and $0 \le k \le L-1$.

The video decoding device uses the parsed candidate index k to derive the motion information of the sub-region from the motion vector information in the candidate list (S908). The video decoding device compensates for the motion of the sub-region by using the motion information to generate predictor signals of the sub-region (S910). The video decoding device weighted-sums the predictors of the P sub-regions to generate a final predictor of the current block (S912). Hereinafter, the prediction signal and the predictor may be used interchangeably.

If the sub-region-specific index k is at least the preset L (No in S904), the video decoding device checks whether the sub-region-specific index k is less than a preset M (>L) (S920).

On the other hand, if the sub-region-specific index k is less than the preset M (Yes in S920), the video decoding device performs the following steps for performing the intra prediction on each sub-region.

Figure 10:
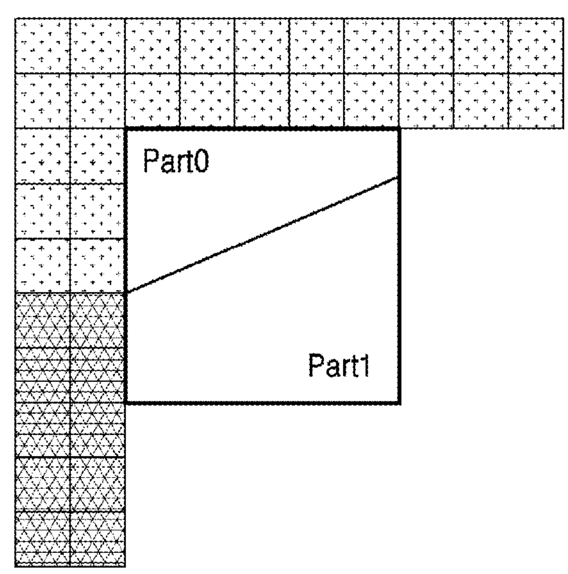
FIG. 10 is a diagram illustrating blocks spatially adjacent to sub-regions, according to at least one embodiment of the present disclosure.

In one example, the video decoding device composes a most probable mode candidate list (MPM candidate list) from the reconstructed neighboring regions of the current block (S922). In composing the list, the video decoding device may compose the candidate list by identifying blocks that are spatially adjacent to the sub-region, as shown in the example of FIG. 10.

Figure 11:
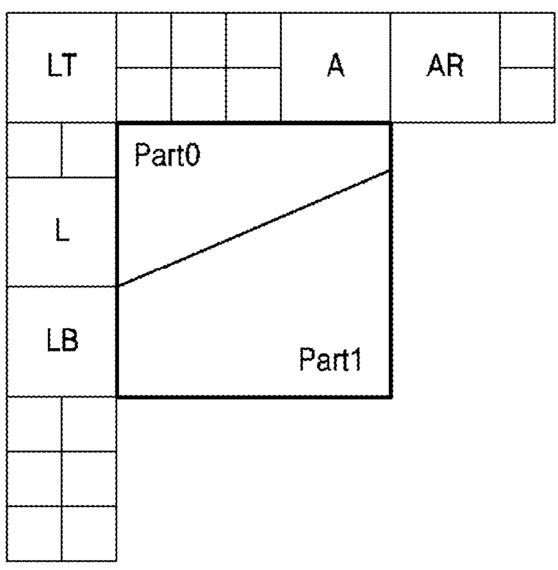
FIG. 11 is a diagram illustrating blocks spatially adjacent to sub-regions, according to another embodiment of the present disclosure.
Figure 11:
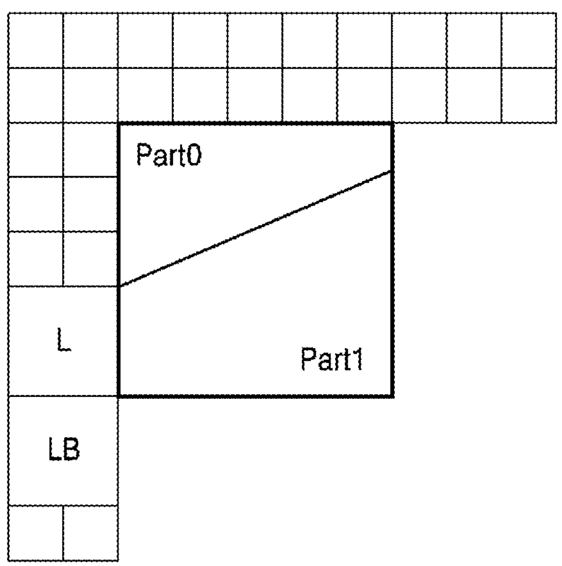

As another example shown in FIG. 11, the following describes a case where the current block is partitioned into Part0 and Part1 based on the partition information. For Part0, the video decoding device may compose the MPM list by using spatially adjacent neighboring blocks of the sub-region, such as A, AR, L, LB, and LT. For Part1, spatially adjacent neighboring blocks in the sub-region, such as L, LB, may be utilized.

In this case, the number of candidates may be M−L. Namely, this case may compose a list including the number M−L of candidates by using an index reflecting +L in each turn according to an agreed order between the video encoding device and the video decoding device. Accordingly, k may be defined by $L \le k \le M-1$.

As yet another example, the video decoding device may, based on the geometric partition information of the current block, organize the prediction modes in the same direction as the partition direction or partition angle into the candidate list. In this case, the candidate list may be composed by further using modes in the +1, +2, −1, and −2 directions of the prediction mode, a mode in a direction perpendicular to the partition direction, and a planar mode.

As yet another example, if a reconstructed neighboring block of the current block is predicted in an intra-prediction mode, the video decoding device may use that prediction mode to compose the candidate list. Additionally, the candidate list may be composed by further using modes in the +1, +2, −1, and −2 directions of that mode, and a planar mode.

As yet another example, if a reconstructed neighboring block of the current block is predicted in a geometric prediction mode, the video decoding device may compose the candidate list with a prediction mode in the same direction as the partition direction based on the geometric partition information of the block. The candidate list may also be composed by further using modes in the +1, +2, −1, and −2 directions of the prediction mode, modes in the direction perpendicular to the partition direction, and planar mode.

As yet another example, the video decoding device may derive, from a reconstructed neighboring region of the current block, the directionality of the reconstructed neighboring region, and then compose a candidate list of prediction modes corresponding to the derived directionality. At this time, the video decoding device may calculate the gradient values of the pixels in the neighboring region and derive the directionality by using the calculated gradient values.

The video decoding device derives an intra-prediction mode from the MPM candidate list by using the parsed candidate index k (S924). The video decoding device performs an intra prediction according to the intra-prediction mode to generate a prediction signal of the sub-region (S926). The video decoding device weighted-sums the predictors of the P sub-regions to generate a final predictor of the current block (S912).

As one example, the following describes a case where the reconstructed samples on the top and left that are spatial neighbors of the current block are the same as in the example of FIG. 10. In this case, the video decoding device may perform an intra prediction on the sub-region having the reconstructed neighboring samples with the largest area. For example, the video decoding device may perform an intra prediction on Part0 illustrated in FIG. 10.

On the other hand, if the sub-region-specific index k is M that is preset (No in S920), the video decoding device checks whether template matching is feasible (S930).

Figure 12:
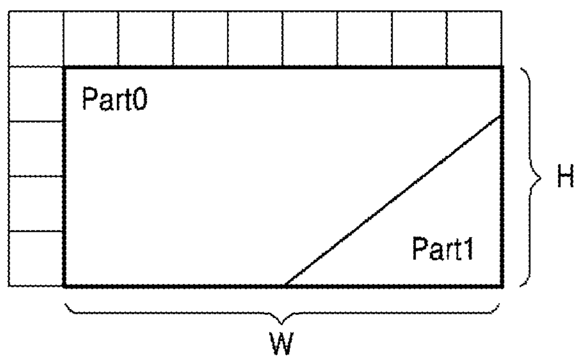
FIG. 12 is a diagram illustrating a geometric partition of the current block, according to at least one embodiment of the present disclosure.

As an example, if the size of the adjacent region between the top and left reference sample lines of the current block and the sub-region is smaller than a preset threshold, such as Part 1 illustrated in FIG. 12, the video decoding device may not perform template matching. In this case, a common value based on the size of the current block may be implicitly used as the threshold in the video encoding device and the video decoding device.

If template matching is feasible (Yes in S930), the video decoding device performs the following steps for template matching for each sub-region.

The video decoding device defines a template for the sub-region by using the reconstructed neighboring region of the sub-region and then performs template matching to generate predicted signals of the sub-region (S932). The video decoding device weighted-sums the predictors of the P sub-regions to generate a final predictor for the current block (S912).

On the other hand, if template matching is not feasible (No in S930), the video decoding device performs the following steps for each sub-region.

The video decoding device generates predictor signals of the sub-region by compensating for a motion of the sub-region by using a zero motion vector (S940). The video decoding device weighted-sums the predictors of the P sub-regions to generate a final predictor of the current block (S912).

For example, if the size of the adjacent region between the top and left reference sample lines of the current block and the sub-region is smaller than a predetermined threshold, and the index of the sub-region is M, then the video decoding device may generate the predicted signals of the sub-region by using the zero motion vector. Here, the zero motion vector indicates a region at the same position as the sub-region in the reference frame. For example, the video decoding device may generate the predicted signals of Part 1 by using a region at the same location as Part 1 illustrated in FIG. 12 in the reference frame.

The application of the geometric prediction mode according to the example of FIGS. 9A and 9B may be similarly performed by the video encoding device.

Figure 13A:
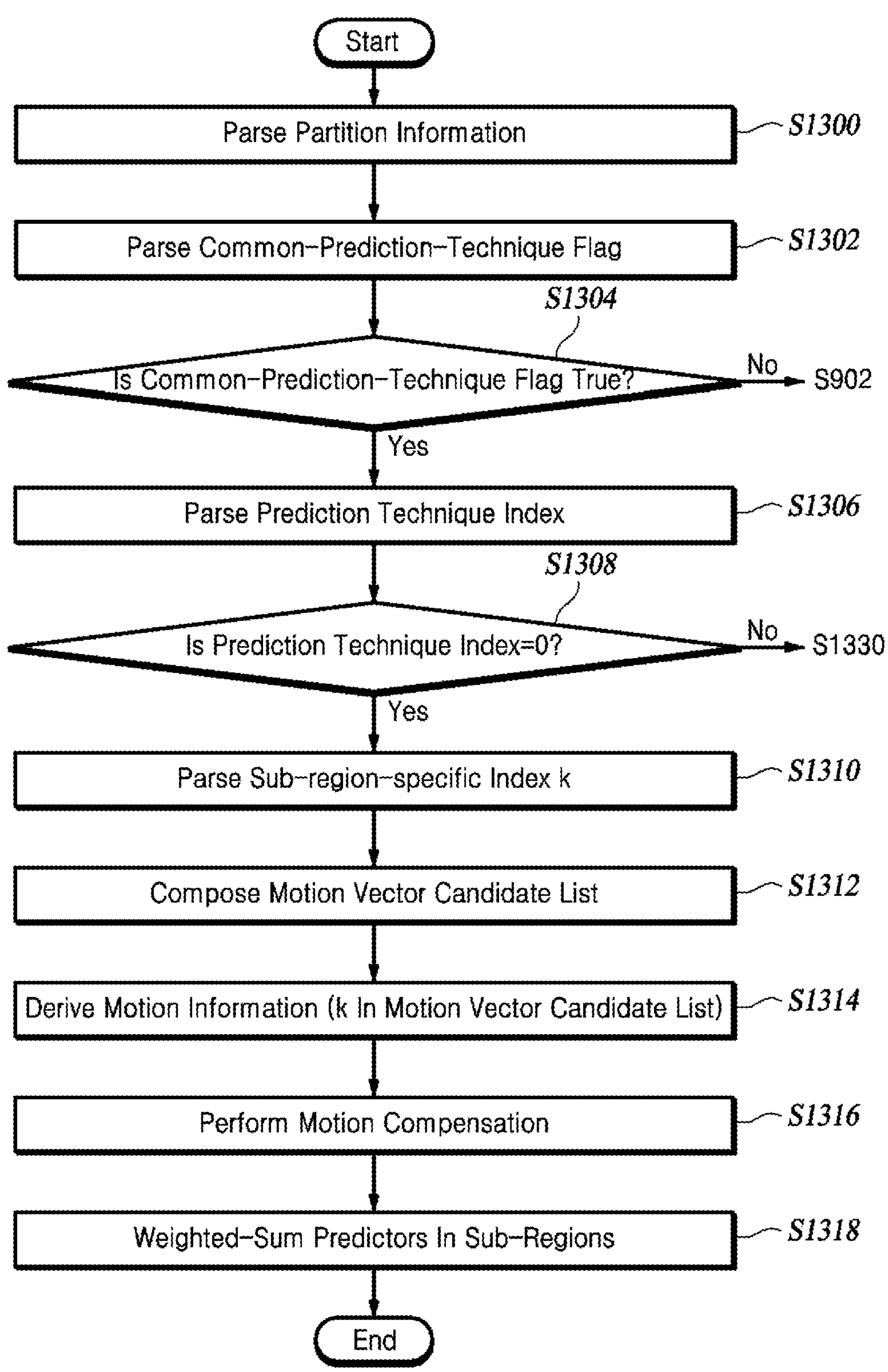
FIGS. 13A and 13B are a flowchart of a prediction of the current block based on the geometric prediction mode, according to another embodiment of the present disclosure.
Figure 13B:
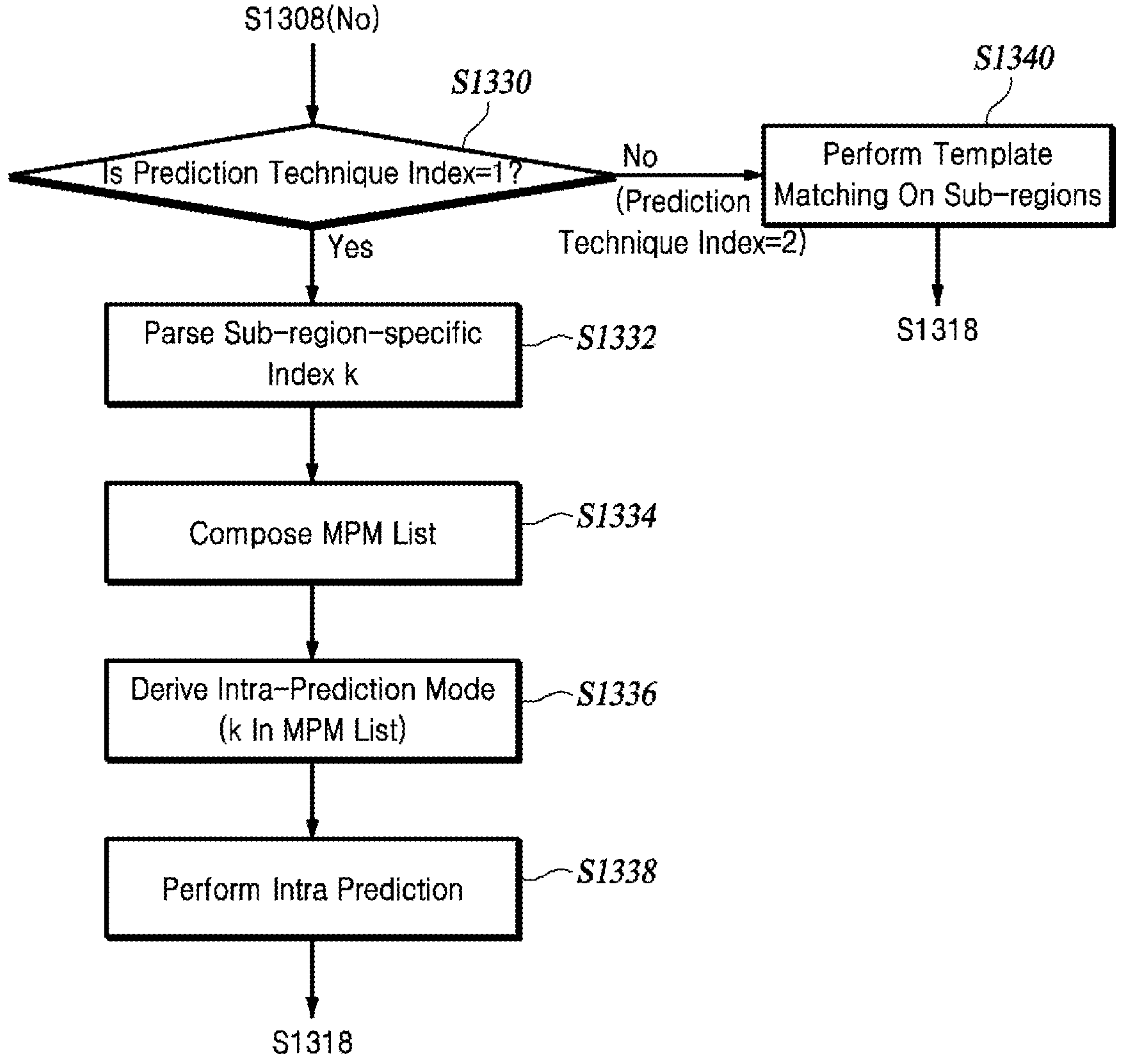

FIGS. 13A and 13B are a flowchart of a prediction of the current block based on the geometric prediction mode, according to another embodiment of the present disclosure.

In geometric prediction mode, as illustrated in FIGS. 13A and 13B, the video decoding device partitions the current block into a plurality of sub-regions, performs a prediction for each sub-region, and then utilizes the sub-regions to generate a final prediction block. The example of FIGS. 13A and 13B is a flowchart detailing Step S704 performed when the geometric prediction mode flag is true.

The video decoding device parses the geometric partition information of the current block (S1300). As described above, based on the geometric partition information, the current block may be partitioned into P sub-regions.

The video decoding device parses a common-prediction-technique flag (S1302). Here, the common-prediction-technique flag indicates whether the sub-regions are subject to the same prediction technique.

The video decoding device checks the common-prediction-technique flag (S1304).

If the common-prediction-technique flag is false (No in S1304), the video decoding device performs the steps according to the example of FIGS. 9A and 9B because the prediction techniques for the sub-regions are not the same.

On the other hand, if the common-prediction-technique flag is true (Yes in S1304), the video decoding device may predict all sub-regions by using inter-prediction, predict all sub-regions by using intra-prediction, or predict all sub-regions by using template matching, according to the following steps.

The video decoding device parses the prediction technique index (S1306). Based on the prediction technique index, the video decoding device may determine a prediction technique for the sub-regions.

The video decoding device determines if the prediction technique index is zero (S1308).

If the prediction technique index is zero (Yes in S1308), indicating an inter prediction, the video decoding device may perform the following steps.

The video decoding device parses the sub-region-specific index k for the P sub-regions (S1310).

The video decoding device composes a motion vector candidate list for the sub-regions (S1312). The video decoding device uses the parsed candidate index k to derive the motion information of the sub-region from the motion vector information in the candidate list (S1314).

The video decoding device compensates for the motion of the sub-region by using the motion information to generate predictor signals of the sub-regions (S1316). The video decoding device weighted-sums the predictors of the P sub-regions to generate a final predictor of the current block (S1318).

On the other hand, if the prediction technique index is non-zero (No in S1308), the video decoding device determines whether the prediction technique index is one (S1330).

If the prediction technique index is 1 (Yes in S1330), indicating an intra prediction, the video decoding device performs the following steps.

The video decoding device parses the sub-region-specific index k for the P sub-regions (S1332).

The video decoding device composes an MPM candidate list for the sub-regions (S1334). The video decoding device uses the parsed candidate index k to derive an intra-prediction mode from the MPM candidate list (S1336). The video decoding device performs an intra prediction according to the intra-prediction mode to generate predicted signals for the sub-region (S1338). The video decoding device weighted-sums the predictors of the P sub-regions to generate a final predictor for the current block (S1318).

On the other hand, if the prediction technique index is not 1 (No in S1330), e.g., the prediction technique index is 2, indicating a template matching, the video decoding device performs the following steps.

The video decoding device defines a template of the sub-region by using the reconstructed neighboring region of the sub-region and then performs template matching on the sub-regions to generate prediction signals of the sub-region (S1340). The video decoding device weighted-sums the predictors of the P sub-regions (S1318) to generate a final predictor of the current block.

The application of the geometric prediction mode according to the example of FIGS. 13A and 13B may be similarly performed by the video encoding device.

Figure 14:
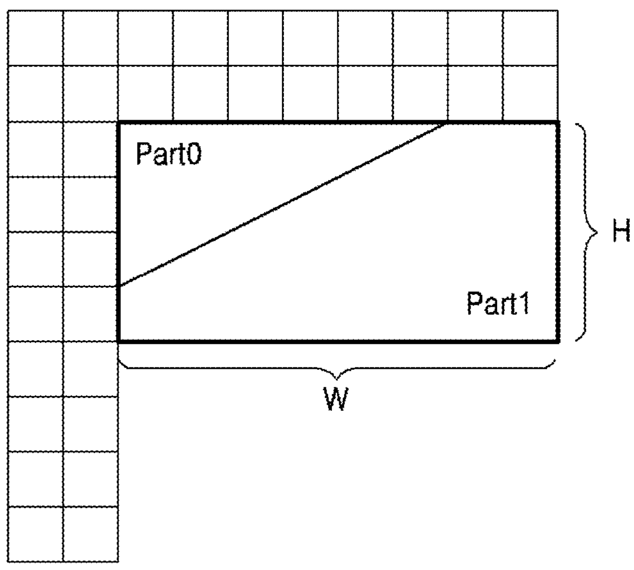
FIG. 14 is a diagram illustrating a case where sub-regions are predicted according to an intra prediction.

The following describes a prediction process for a case where a sub-region is predicted according to the intra prediction and a Part0 sub-region as illustrated in FIG. 14 is predicted according to the directional mode.

In one example, depending on the aspect ratio (W:H) of the current block for the prediction mode of the Part0 sub-region, the video decoding device may perform the prediction by using a directional mode rotated by 180 degrees. Here, W represents the width of the current block and H represents the height of the current block.

Figure 15:
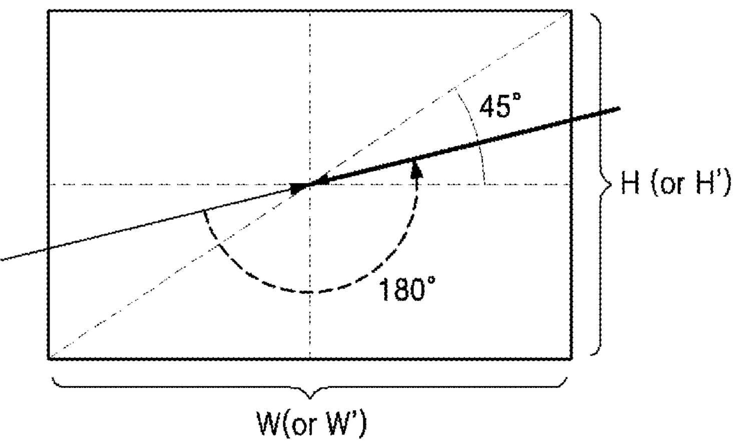
FIG. 15 is a diagram illustrating a directional prediction mode rotated 180 degrees based on the aspect ratio of the current block.
Figure 15:
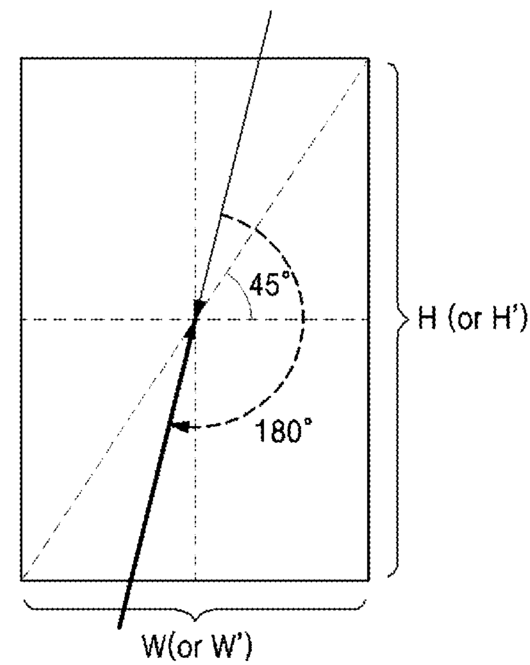

In one example, if W>H, the directional prediction mode having an angle greater than 180 degrees and less than 225 degrees may be changed to a directional prediction mode rotated by 180 degrees, as shown in the example of FIG. 15. Alternatively, if W<H, a directional prediction mode having an angle greater than 45 degrees and less than 90 degrees may be changed to a directional prediction mode rotated by 180 degrees, as shown in the example of FIG. 15. In this case, the range of the mode for performing the 180-degree rotated prediction may vary depending on the aspect ratio of the current block.

Figure 16:
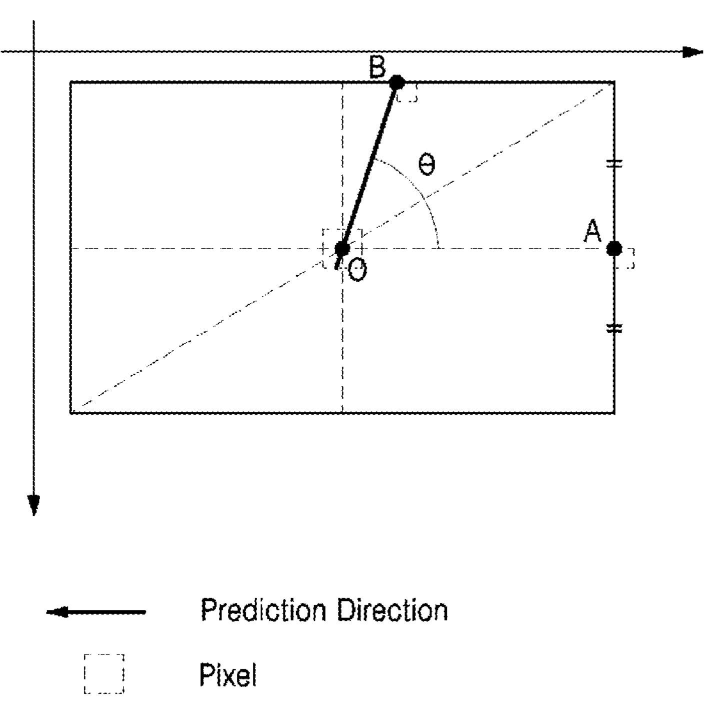
FIG. 16 is a diagram defining an angle of a directional prediction mode, according to at least one embodiment of the present disclosure.

The angle of the directional prediction mode may be defined as in the example of FIG. 16. B denotes the position of the reference sample used to predict the center of the current block according to the directional prediction mode. Denoted by A is the point where the partition line that passes through the center O and partitions the current block into two horizontal parts meets with the right boundary of the current block. Here, ≤AOB may be defined as the angle of the directional prediction mode.

Figure 17:
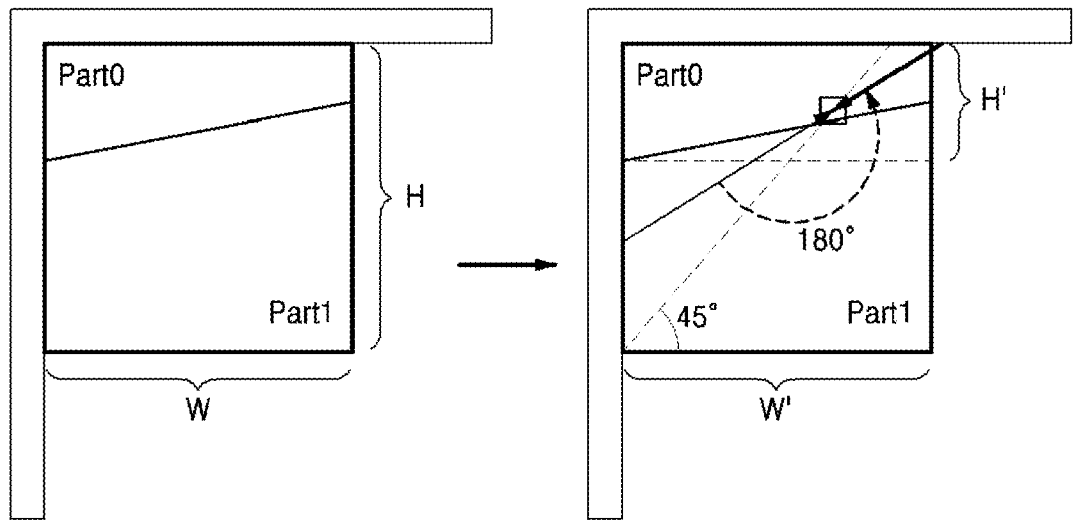
FIG. 17 is a diagram illustrating a directional prediction mode rotated 180 degrees based on an aspect ratio of a region including sub-regions.

As an example, as shown in FIG. 17, for the prediction mode of the Part0 sub-region, in place of the aspect ratio of the current block when the partition information of the current block is used, the present disclosure may use for prediction, a directional mode rotated 180 degrees according to the aspect ratio (W':H') of the region including the Part0 sub-region.

In one example, if W'>H', a directional prediction mode having an angle greater than 180 degrees and less than 225 degrees may be changed to a directional prediction mode rotated 180 degrees, as shown in the example of FIG. 15. Alternatively, if W'<H', the directional prediction mode having an angle greater than 45 degrees and less than 90 degrees may be changed to a directional prediction mode rotated by 180 degrees, as shown in the example of FIG. 15. In this case, the range of the mode for performing the 180-degree rotated prediction may vary depending on the aspect ratio of the region including the sub-region.

Figure 18:
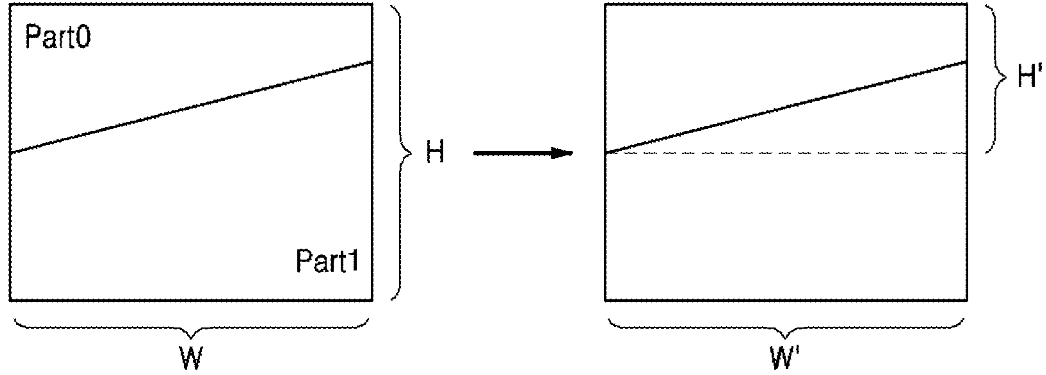
FIG. 18 is a diagram illustrating the width and height of a region including sub-regions, according to at least one embodiment of the present disclosure.

As one example, after the current block is partitioned according to the geometric partition information, W' and H' may be determined as the width and height for a rectangular shape including each sub-region, as shown in the example of FIG. 18.

Figure 19:
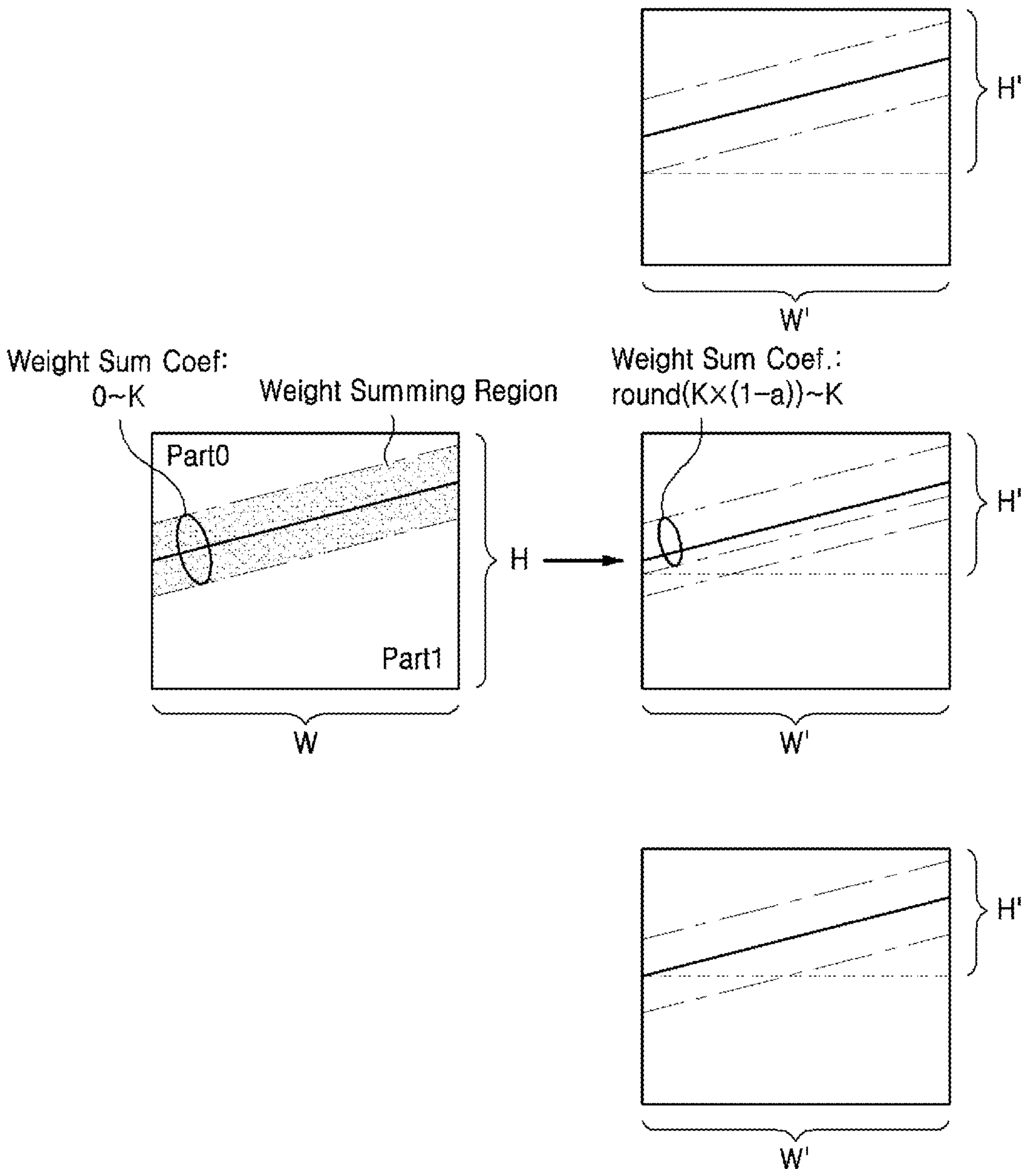
FIG. 19 is a diagram illustrating the width and height of a region including sub-regions, according to another embodiment of the present disclosure.

As another example, the following describes the case where the weighted-summing coefficient used in the geometric prediction mode ranges from 0 to K, as illustrated in the left of FIG. 19. In the left example of FIG. 19, about the Part0 sub-region, the farther away from the partition boundary to the inside of the Part0 sub-region, the more the weighted-summing coefficient approaches K, and the farther away from the partition boundary to the outside of the Part0 sub-region, the more the weighted-summing coefficient approaches 0. For any real number 'a' satisfying 0≤a≤1, W' and H' may be determined as the size of the region containing the weighted-summing coefficient K~round(K×(1−a)), as shown in the examples on the right side of FIG. 19. In the first example on the right in FIG. 19, where 'a' is 1, the weighted-summing factor ranges from 0 to K. In the second example on the right of FIG. 19, where 0.5<a<1, the weighted-summing coefficient may range from round(K×(1−a)) to K. In the third example on the right of FIG. 19, where 'a' is 0.5, the weighted-summing coefficient may range from 0.5K to K.

At this point, the video encoding device may determine an optimal 'a' in terms of rate-distortion optimization and signal the optimal 'a' to the video decoding device. The video decoding device may utilize the parsed value of 'a'. Alternatively, 'a' may be a preset value based on a prior arrangement between the video encoding device and the video decoding device.

Figure 20:
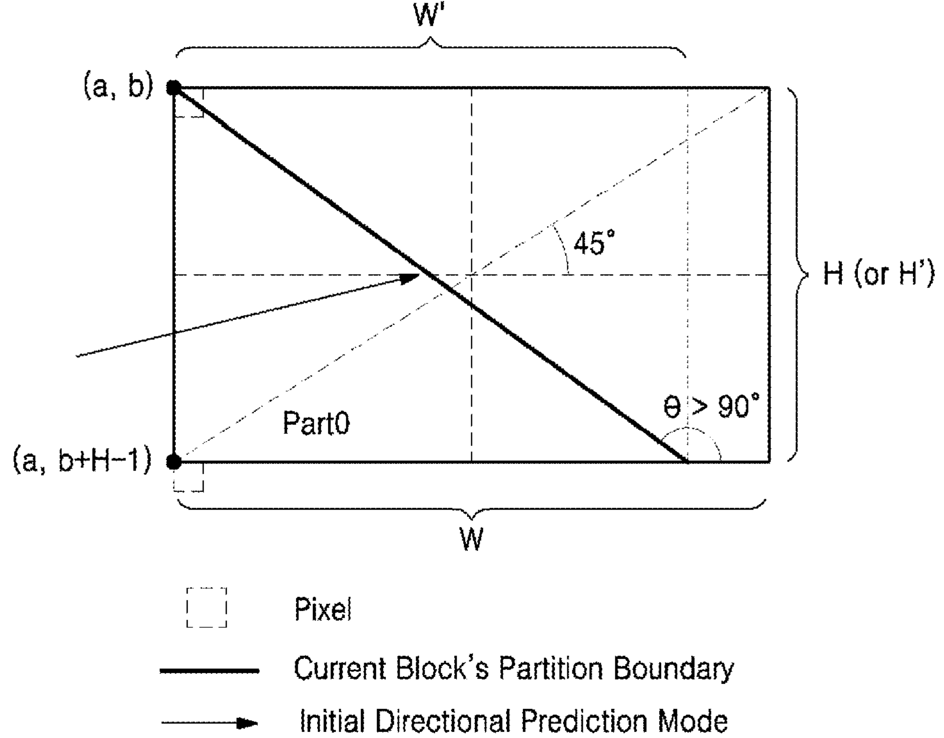
FIGS. 20 and 21 are diagrams illustrating the use of an initial directional mode based on an aspect ratio of a region including sub-regions.

As an example, the following describes a case where the top-left coordinate of the current block is (a, b) and W>H or W'>H', as shown in the example of FIG. 20. If the current sub-region Part0 includes the bottom-left corner (a, b+H−1) of the current block, and the angle (θ) of the partition directionality of the partition boundary including the current sub-region is greater than 90 degrees, the 180-degree rotated directional prediction mode is not used, and the initial directional prediction mode may be used. In this case, W' and H' may be determined as in the example of FIG. 18 or FIG. 19.

Figure 21:
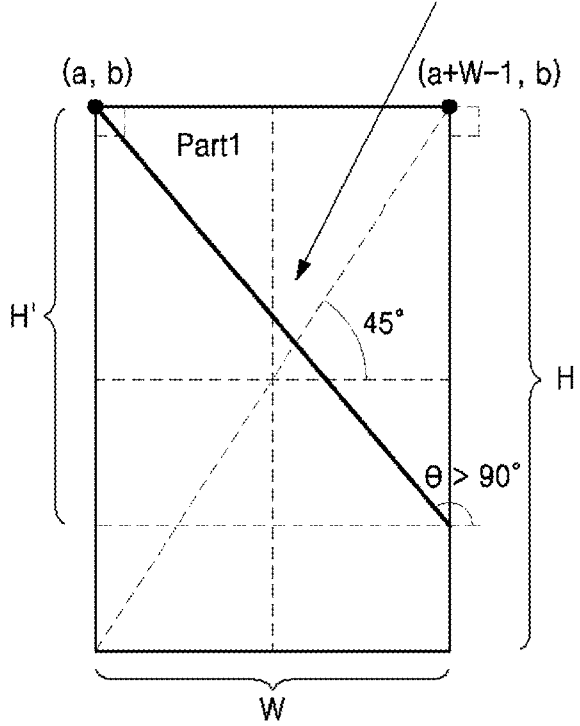

As an example, the following describes a case where the top-left coordinate of the current block is (a, b) and W<H or W'<H', as shown in the example of FIG. 21. If the current sub-region Part1 includes the top-right corner (a+W−1, b) of the current block, and the angle (θ) of the partition directionality of the partition boundary including the current sub-region is greater than 90 degrees, the 180-degree rotated directional prediction mode is not used, and the initial directional prediction mode may be used. In this case, W' and H' may be determined as in the example of FIG. 18 or FIG. 19.

On the other hand, after the final directional prediction mode is determined, if the slope of the final directional prediction mode is an integer, the reference samples on the reconstructed reference sample line in the spatial neighborhood of the current block may be corrected by using a smoothing filter. Alternatively, if the gradient of the final directional prediction mode is a real number, the reference samples may be corrected by using an interpolation filter (IF). In this case, the IF may be implemented as a DCT-IF based on the Discrete Cosine Transform (DCT). Further, the directional prediction mode may be an integer-slope mode or a fractional-slope mode, depending on the ratio between width and height (or width and height) utilized to estimate the slope.

As described above, the video decoding device may generate the prediction signals for each sub-region and finally weighted-sum the prediction signals to generate the final prediction signals of the current block.

In one example, the weighted-summing coefficients may be determined according to a prior arrangement between the video encoding device and the video decoding device based on the height, width, and partition information of the current block.

As another example, the video encoding device may determine weighted-summing coefficients in terms of optimizing rate distortion and may signal the weighted-summing coefficients to the video decoding device. The video decoding device may parse the weighted-summing coefficients and may use the weighted-summing coefficients to generate a weighted-sum of the predictors of the sub-regions. In this case, when one or more of the sub-regions are predicted by intra-prediction, the region including the sub-region for determining the final intra-prediction method may be a region determined according to the example of FIG. 18 or FIG. 19.

In one example, the video decoding device may use the prediction signals of each sub-region to obtain the amount of change in the brightness value of the pixel in each sub-region, and then may use the pixel brightness change to adaptively derive and use the weighted-summing coefficients. In this case, when one or more of the sub-regions are predicted by intra-prediction, the region including the sub-region for determining the final intra-prediction method may be a region determined according to the example of FIG. 18 or FIG. 19.

Although the steps in the respective flowcharts are described to be sequentially performed, the steps merely instantiate the technical idea of some embodiments of the present disclosure. Therefore, a person having ordinary skill in the art to which this disclosure pertains could perform the steps by changing the sequences described in the respective drawings or by performing two or more of the steps in parallel. Hence, the steps in the respective flowcharts are not limited to the illustrated chronological sequences.

It should be understood that the above description presents illustrative embodiments that may be implemented in various other manners. The functions described in some embodiments may be realized by hardware, software, firmware, and/or their combination. It should also be understood that the functional components described in the present disclosure are labeled by " . . . unit" to strongly emphasize the possibility of their independent realization.

Meanwhile, various methods or functions described in some embodiments may be implemented as instructions stored in a non-transitory recording medium that can be read and executed by one or more processors. The non-transitory recording medium may include, for example, various types of recording devices in which data is stored in a form readable by a computer system. For example, the non-transitory recording medium may include storage media, such as erasable programmable read-only memory (EPROM), flash drive, optical drive, magnetic hard drive, and solid state drive (SSD) among others.

Although embodiments of the present disclosure have been described for illustrative purposes, those having ordinary skill in the art to which this disclosure pertains should appreciate that various modifications, additions, and substitutions are possible, without departing from the idea and scope of the present disclosure. Therefore, embodiments of the present disclosure have been described for the sake of brevity and clarity. The scope of the technical idea of the embodiments of the present disclosure is not limited by the illustrations. Accordingly, those having ordinary skill in the art to which the present disclosure pertains should understand that the scope of the present disclosure should not be limited by the above explicitly described embodiments but by the claims and equivalents thereof.

REFERENCE NUMERALS

120: predictor
155: entropy encoder
510: entropy decoder
530: inverse transformer
540: predictor
602: prediction unit-determiner
604: prediction technique-determiner
606: prediction mode-determiner
608: predict performer

What is claimed is:

1. A method of predicting a current block, performed by a video decoding device, the method comprising:

decoding, from a bitstream, geometric partition information of the current block;

partitioning the current block into multiple sub-regions according to the geometric partition information;

determining prediction techniques of the multiple sub-regions based on index information obtained from the bitstream;

generating predictors of the multiple sub-regions using the prediction techniques of the multiple sub-regions; and generating a final predictor of the current block by blending the predictors of the multiple sub-regions based on weights of the multiple sub-regions, wherein, based on the prediction techniques of the multiple sub-regions using an intra prediction, generating the predictors of the multiple sub-regions includes generating an intra prediction candidate list using information of a reconstructed neighboring region of the current block, obtaining intra prediction candidate index information from the bitstream, determining prediction modes of the multiple sub-regions based on the intra prediction candidate list and the intra prediction candidate index information, and generating the predictors of the multiple sub-regions using the prediction modes of the multiple sub-regions.

2. The method of claim 1, further comprising:

decoding from the bitstream a geometric prediction mode flag that indicates whether or not a geometric prediction mode is applied to the current block based on the geometric partition information; and checking the geometric prediction mode flag, wherein, based on the geometric prediction mode flag being true, the method further includes decoding the geometric partition information.

3. The method of claim 1, wherein decoding the geometric partition information comprises:

decoding from the bitstream an index indicative of the geometric partition information; and obtaining, by using the index, the geometric partition information from a predefined lookup table (LUT).

4. The method of claim 1, wherein, based on the prediction techniques of the multiple sub-region using an intra prediction and an inter prediction, generating the predictors of the multiple sub-regions comprises:

generating an intra prediction candidate list and an inter prediction candidate list using prediction information of the reconstructed neighboring region of the current block;

obtaining intra prediction candidate index information and inter prediction candidate index information from the bitstream;

determining an intra prediction mode of one sub-region based on the intra prediction candidate list and the intra prediction candidate index information;

determining motion information of another sub-region based on the inter prediction candidate list and the inter prediction candidate index information; and generating the predictors of the multiple sub-regions using the prediction mode and the motion information.

5. The method of claim 1, wherein, generating the intra prediction candidate list comprises:

using a directional prediction mode derived based on gradient values of pixels in the reconstructed neighboring region.

6. The method of claim 1, wherein generating the intra prediction candidate list comprises:

using a prediction mode having a direction parallel to a partition direction for the multiple sub-regions, a prediction mode having a direction perpendicular to the partition direction, and a planar mode.

7. The method of claim 1, wherein generating the intra prediction candidate list, based on the reconstructed neighboring blocks of the current block being predicted in an intra-prediction mode, comprises:

composing the intra-prediction mode into the intra prediction candidate list; and composing the intra prediction candidate list by further using modes in +1, +2, −1, and −2 directions of the intra-prediction mode, and a planar mode.

8. The method of claim 1, wherein generating the intra prediction candidate list, based on the reconstructed neighboring blocks of the current block being predicted in a geometric prediction mode, comprises:

composing, based on geometric partition information of at least one of the neighboring blocks, a prediction mode having a direction parallel to a partition direction or partition angle of the neighboring blocks, into the intra prediction candidate list; and composing the intra prediction candidate list by further using modes in +1, +2, −1, and −2 directions of the prediction mode having the direction parallel to the partition direction or partition angle, a prediction mode having a direction perpendicular to the partition direction, and a planar mode.

9. The method of claim 1, wherein, based on a prediction technique of one sub-region using a template matching prediction, generating the predictors of the multiple sub-regions comprises:

determining whether the template matching prediction is available for the one sub-region; and based on the template matching prediction being available, generating a predictor of the one sub-region by performing the template matching prediction on a restructured neighboring region of the one sub-region.

10. The method of claim 9, wherein determining whether the template matching prediction is available comprises:

comparing a boundary length between top and left reference sample lines of the current block and the one sub-region with a predetermined threshold.

11. The method of claim 9, wherein generating the predictor for the one sub-region, based on the template matching prediction not being available, comprises:

generating the predictor for the one sub-region by using a zero-motion vector.

12. A method of predicting a current block, performed by a video encoding device, the method comprising:

determining geometric partition information of the current block;

partitioning the current block into multiple sub-regions according to the geometric partition information;

determining prediction techniques of the multiple sub-regions;

generating predictors of the multiple sub-regions using the prediction techniques of the multiple sub-regions;

generating a final predictor of the current block by blending the predictors of the multiple sub-regions based on weights of the sub-regions; and encoding the geometric partition information of the current block and the prediction techniques of the multiple sub-regions, wherein, based on the prediction techniques of the multiple sub-regions using an intra prediction, generating the predictors of the multiple sub-regions includes generating an intra prediction candidate list using information of a reconstructed neighboring region of the current block;

determining prediction modes of the multiple sub-regions from the intra prediction candidate list; and generating the predictors of the multiple sub-regions using the prediction modes of the multiple sub-regions.

13. The method of claim 12, wherein generating the intra prediction candidate list comprises:

generating the intra prediction candidate list using a directional prediction mode derived based on gradient values of pixels in the reconstructed neighboring region.

14. The method of claim 13, further comprising:

determining a geometric prediction mode flag that indicates whether or not a geometric prediction mode is applied to the current block; and encoding the geometric prediction mode flag.

15. The method of claim 12, further comprising:

determining an index indicative of the geometric partition information from a predefined lookup table (LUT); and encoding the index.

16. A method for transmitting encoded video data including a bitstream, the method comprising:

generating the bitstream for a current block in an image; and transmitting the bitstream, wherein generating the bitstream for the current block includes determining geometric partition information of a current block, partitioning the current block into multiple sub-regions according to the geometric partition information, determining prediction techniques of the multiple sub-regions, generating predictors of the multiple sub-regions using the prediction techniques of the multiple sub-regions;

generating a final predictor of the current block by blending the predictors of the multiple sub-regions based on weights of the multiple sub-regions, and encoding the geometric partition information of the current block and the prediction techniques of the multiple sub-regions, and wherein, based on the prediction techniques of the multiple sub-regions using an intra prediction, generating the predictors of the multiple sub-regions includes generating an intra prediction candidate list using information of a reconstructed neighboring region of the current block, determining prediction modes of the multiple sub-regions from the intra prediction candidate list, and generating the predictors of the sub-regions using the prediction modes of the sub-regions.

* * * * *